(12) United States Patent
Mittal et al.

(10) Patent No.: US 11,644,633 B2
(45) Date of Patent: May 9, 2023

(54) HIGH DENSITY OPTICAL FIBRE RIBBON STACK

(71) Applicant: Sterlite Technologies Limited, Gurgaon (IN)

(72) Inventors: Manoj Mittal, Gurgaon (IN); Jitendra Balakrishnan, Gurgaon (IN)

(*) Notice: Subject to any disclaimer, the term of this patent is extended or adjusted under 35 U.S.C. 154(b) by 0 days.

(21) Appl. No.: 16/897,845

(22) Filed: Jun. 10, 2020

(65) Prior Publication Data

US 2020/0386962 A1   Dec. 10, 2020

(30) Foreign Application Priority Data

Jun. 10, 2019 (IN) .............................. 201911022911
Jun. 10, 2019 (IN) .............................. 201911023007
Feb. 20, 2020 (IN) .............................. 202011007287

(51) Int. Cl.
*G02B 6/44* (2006.01)

(52) U.S. Cl.
CPC ........... *G02B 6/448* (2013.01); *G02B 6/4432* (2013.01)

(58) Field of Classification Search
CPC .................................. G02B 6/449; G02B 6/448
See application file for complete search history.

(56) References Cited

U.S. PATENT DOCUMENTS

| 2003/0026559 A1* | 2/2003 | VanVickle | G02B 6/4494 |
| | | | 385/112 |
| 2006/0131061 A1* | 6/2006 | Seigerschmidt | H01B 7/0892 |
| | | | 174/117 FF |

FOREIGN PATENT DOCUMENTS

| CN | 109031559 A | * | 12/2018 | |
| CN | 112151216 A | * | 12/2020 | |
| DE | 4206652 A1 | * | 9/1993 | ........... G02B 6/4403 |
| GB | 2418713 A | * | 4/2006 | ............. D07B 7/169 |
| JP | 07234348 A | * | 9/1995 | ........... G02B 6/4408 |
| JP | 3058203 | * | 7/2000 | ............... G02B 6/44 |

* cited by examiner

*Primary Examiner* — Charlie Y Peng
(74) *Attorney, Agent, or Firm* — Steven R. Fairchild; Michael J. Pennington

(57) ABSTRACT

The present disclosure provides a method for arranging a plurality of optical fiber ribbons in an optical fibre cable. The method includes a set of steps. The set of steps include a first step of receiving the plurality of optical fiber ribbons. Moreover, the set of steps include a second step of arranging the plurality of optical fiber ribbons in a plurality of circular arcs in the optical fibre cable. The plurality of circular arcs is substantially parallel.

22 Claims, 23 Drawing Sheets

200

600

700

800

900

1100

1200

1300

1600

1800

1900

1900

1900

2300

HIGH DENSITY OPTICAL FIBRE RIBBON STACK

BACKGROUND

Field of the Invention

The present disclosure relates to the field of optical fiber ribbons and, in particular, relates to a high density optical fiber ribbon stack and method for manufacturing the high density optical fiber ribbon stack. The present application is based on, and claims priority from Indian application number 201911022911 filed on 10 Jun. 2019, Indian application number 201911023007 filed on 10 Jun. 2019 and Indian application number 202011007287 filed on 20 Feb. 2020, the disclosure of which is hereby incorporated by reference herein.

Description of the Related Art

Over the last few years, optical fiber cables are widely used for communication over long distances. As a result, there is a demand for fiber optic cables with greater number of optical fibers. Optical fiber ribbons have been developed in order to meet the demands for increased optical fiber count in optical fiber cables. Optical fiber ribbons are planar arrays of optical fibers that are bonded together as a unit. Optical fiber ribbons are advantageous because many ribbons can be arranged together to form an optical fiber ribbon stack. Typically, the optical fiber ribbon stack is packed within a buffer tube with low packing efficiency. However, the low packing efficiency of the optical fiber ribbon stack within the buffer tube makes it challenging to reduce diameter of the optical fiber cable in which it is installed.

In light of the above stated discussion, there is a need for an optical fiber ribbon stack which can overcome the above stated disadvantages.

SUMMARY

In an aspect, the present disclosure provides a method for arranging a plurality of optical fiber ribbons in an optical fiber cable. The method includes a set of steps. The set of steps include a first step of receiving the plurality of optical fiber ribbons. Moreover, the set of steps include a second step of arranging the plurality of optical fiber ribbons in a plurality of circular arcs in the optical fiber cable. The plurality of circular arcs is substantially parallel.

A primary object of the present disclosure is to provide a high density optical fiber ribbon stack.

Another object of the present disclosure is to provide the optical fiber ribbon stack with high packing efficiency.

Yet another object of the present disclosure is to provide the optical fiber ribbon stack with bendable ribbons.

Yet another object of the present disclosure is to provide the optical fiber ribbon stack enclosed in a buffer tube to optimize fiber packing density within optical fiber cable.

Yet another object of the present disclosure is to provide a design and arrangement of dies and method for stacking ribbons in optical fiber cables.

Yet another object of the present disclosure is to provide a method to stack high density optical fiber ribbon stack in a buffer tube in optical fiber cables.

Yet another object of the present disclosure is to provide the optical fiber ribbon stack with bendable ribbons.

Yet another object of the present disclosure is to provide the optical fiber ribbon stack enclosed in the buffer tube to optimize fiber packing efficiency within optical fiber cable.

Yet another object of the present disclosure is to provide a method to increase packing density in high fiber count optical fiber cable.

Yet another object of the present disclosure is to provide the optical fiber cable with high packing density of a buffer tube.

In an embodiment of the present disclosure, the plurality of optical fiber ribbons is arranged concentrically by a guide.

In an embodiment of the present disclosure, the plurality of optical fiber ribbons are wrapped with one or more of one or more yarns, one or more binders, one or more tapes and one or more layers.

In an embodiment of the present disclosure, each circular arc of the plurality of circular arcs is in contact with at least one circular arc of the plurality of circular arcs.

In an embodiment of the present disclosure, the plurality of circular arcs is in a buffer tube.

In an embodiment of the present disclosure, the step of arranging the plurality of optical fiber ribbons further includes placing the plurality of optical fiber ribbons such that at least one of a top surface and a bottom surface of each optical fiber ribbon of the plurality of optical fiber ribbons is in contact with at least one optical fiber ribbon of the plurality of optical fiber ribbons.

In an embodiment of the present disclosure, the plurality of circular arcs is concentric.

In an embodiment of the present disclosure, the plurality of optical fiber ribbons are arranged such that placement of each optical fiber ribbon is defined by a radius and a radius of curvature. The placement of each optical fiber ribbon of the plurality of optical fiber ribbons is defined by a first radius of curvature.

In an embodiment of the present disclosure, the plurality of optical fiber ribbons are arranged such that placement of each optical fiber ribbon is defined by a radius and a radius of curvature. An optical fiber ribbon defined by a first radius is not in contact with other optical fiber ribbon defined by the first radius.

In another aspect, the present disclosure provides an optical fiber cable. The optical fiber cable includes a plurality of optical fiber ribbons and a jacket enclosing the plurality of optical fiber ribbons. The plurality of optical fiber ribbons are arranged in a plurality of circular arcs in the optical fiber cable. The plurality of circular arcs is substantially parallel.

In an embodiment of the present disclosure, the optical fiber cable further includes one or more of one or more buffer tubes and one or more of one or more binding yarns and one or more binding tapes. The plurality of optical fiber ribbons are enclosed in the one or more buffer tubes. The one or more of the one or more binding yarns and the one or more binding tapes are wound around the one or more buffer tubes.

In an embodiment of the present disclosure, the optical fiber cable further includes one or more of one or more yarns, one or more binders, one or more tapes and one or more layers. The one or more of the one or more yarns, the one or more binders, the one or more tapes and the one or more layers wraps the plurality of optical fiber ribbons.

In an embodiment of the present disclosure, each of the plurality of optical fiber ribbons is arranged concentrically.

In an embodiment of the present disclosure, each circular arc of the plurality of circular arcs is in contact with at least one circular arc of the plurality of circular arcs.

In an embodiment of the present disclosure, the plurality of optical fiber ribbons are placed such that at least one of a top surface and a bottom surface of each optical fiber ribbon of the plurality of optical fiber ribbons is contact with at least one optical fiber ribbon of the plurality of optical fiber ribbons.

In an embodiment of the present disclosure, the plurality of circular arcs is concentric.

In an embodiment of the present disclosure, the plurality of optical fiber ribbons are arranged such that placement of each optical fiber ribbon is defined by a radius and a radius of curvature. The placement of each optical fiber ribbon of the plurality of optical fiber ribbons is defined by a first radius of curvature.

In an embodiment of the present disclosure, the plurality of optical fiber ribbons are arranged such that placement of each optical fiber ribbon is defined by a radius and a radius of curvature. An optical fiber ribbon defined by a first radius is not in contact with other optical fiber ribbon defined by the first radius.

In yet another aspect, the present disclosure provides a method for arranging a plurality of optical fiber ribbons in a buffer tube for use in an optical fiber cable. The method includes a set of steps. The set of steps include a first step of receiving a plurality of optical fiber ribbon. The set of steps include a second step of arranging the plurality of optical fiber ribbons in a spiral inside the buffer tube.

In an embodiment of the present disclosure, the optical fiber ribbons are arranged in spirally out direction from a center of the buffer tube towards an inner wall of the buffer tube in a curved shape.

In an embodiment of the present disclosure, the method further includes one or more buffer tubes. The plurality of optical fiber ribbons are arranged in the one or more buffer tubes.

In yet another aspect, the present disclosure provides an optical fiber cable. The optical fiber cable includes a plurality of optical fiber ribbons and a jacket. The plurality of optical fiber ribbons are arranged spirally inside one or more buffer tube. The jacket encloses the plurality of optical fiber ribbons.

In an embodiment of the present disclosure, the optical fiber ribbons are arranged in spirally out direction from a center of the one or more buffer tube towards an inner wall of the one or more buffer tube in a curved shape.

In an embodiment of the present disclosure, the plurality of optical fiber ribbons are wrapped with one or more of one or more yarns, one or more binders, one or more tapes and one or more layers.

In an embodiment of the present disclosure, the plurality of optical fiber ribbons is arranged concentrically inside the one or more buffer tube in a plurality of circular arcs.

In an embodiment of the present disclosure, the optical fiber cable further includes one or more of the one or more buffer tubes and one or more of one or more binding yarns and one or more binding tapes. The plurality of optical fiber ribbons are enclosed in the one or more buffer tubes. The one or more of the one or more binding yarns and the one or more binding tapes are wound around the one or more buffer tubes.

In an embodiment of the present disclosure, the one or more buffer tube has a circular cross-section shape.

In an embodiment of the present disclosure, the one or more buffer tube has a hexagonal cross-section shape.

BRIEF DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

Figure 1:
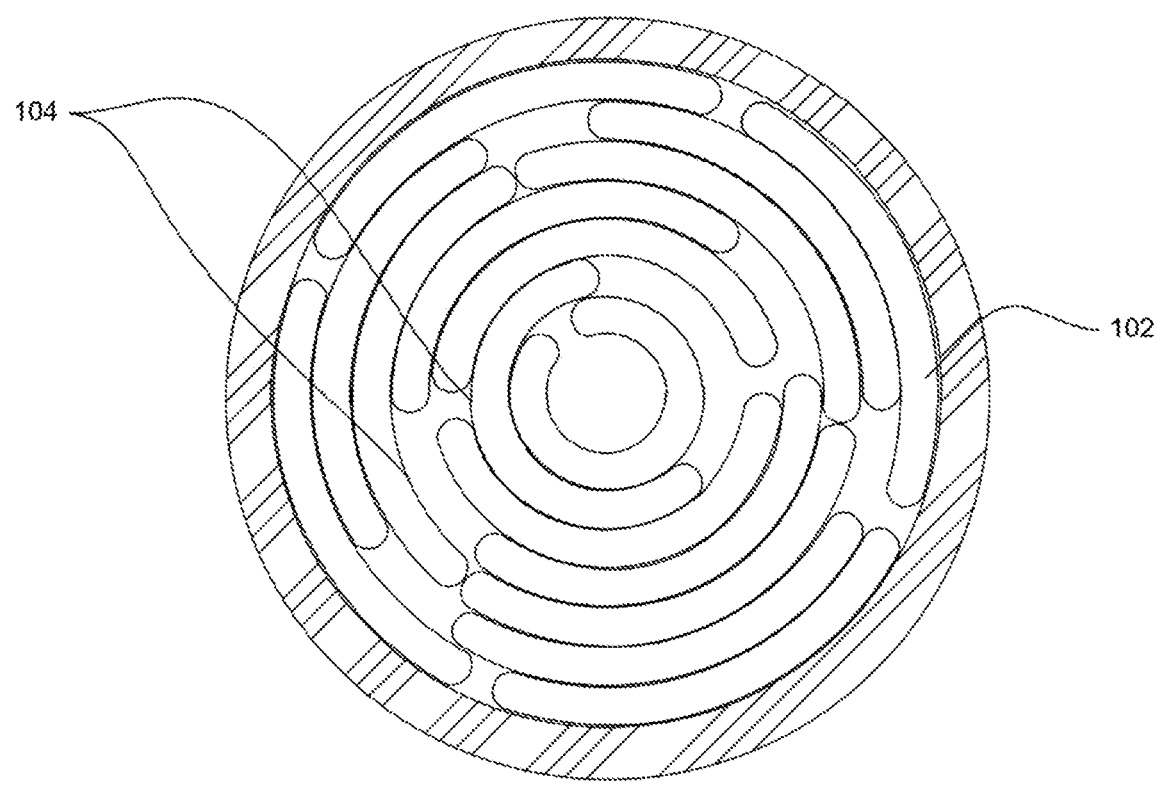
FIG. 1 illustrates a buffer tube enclosing a plurality of optical fiber ribbons, in accordance with an embodiment of the present disclosure.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:
100. Buffer tube.
102. Plurality of optical fiber ribbons.
104. Plurality of circular arcs.
200. Optical fiber cable.
202. Buffer tubes.
204. Geometrical center.
206. Longitudinal axis.
208. Central strength member.
210 Jacket.
400. Machine holder.
402. Lay plate holder.
404. Lay plate.
406. Master die holder.
408. Master die.
410. Guide.
600. General overview.
602. First end.
604. Second end.
606. Main body.
1000. General overview.
1002. First region.
1004. Second region.
1006. Inner cylinder.
1008. Outer cylinder.
1010. First cylinder.
1012. Second cylinder.
1402. Bottom portion.
1404. Top portion.
1702. Upper part.
1704. Bottom part.
1706. Cavity.
1900. Buffer tube.
1902. Geometrical center.
1904. Longitudinal axis.
1906. Plurality of optical fiber ribbons.
2002. Geometrical center.
2004. Longitudinal axis.
2006. Plurality of optical fiber ribbons.
2102. Geometrical center.
2104. Longitudinal axis.
2106. Plurality of optical fiber ribbons.
2202. Geometrical center.
2204. Longitudinal axis.
2302. Geometrical center.
2304. Longitudinal axis.
B1. Breadth.
B2. Breadth.
B3. Breadth.
B4. Breadth.
D1. Diameter.
D2. Diameter.
D3. Diameter.
D4. Diameter.
H1. Height.
H2. Height.
H3. Height.
H4. Height.
H5. Height.
H6. Height.
H7. Height.
W1. Width.
W3. Width.
W4. Width.
W5. Width.
W6. Width.
$\emptyset_1$. Diameter.
$\emptyset_2$. Diameter.
$\emptyset_3$. Diameter.
$\emptyset_4$. Diameter.
$\emptyset_5$. Diameter.
R1. Radius.
R2. Radius.
R3. Radius.
R4. Radius.
S1. Section.
S2. Section.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates a buffer tube 100 enclosing a plurality of optical fiber ribbons 102, in accordance with an embodiment of the present disclosure. In general, buffer tubes provide mechanical isolation to fibers present in the buffer tubes. The plurality of optical fiber ribbons 102 constitutes an optical fiber ribbon stack. In general, optical fiber ribbon stacks include a plurality of optical fiber ribbons arranged together within a matrix material.

The buffer tube 100 includes the plurality of optical fiber ribbons 102. The buffer tube 100 is a loose tube. In general, optical fiber ribbons are made of a number of optical fibers bonded together. In an embodiment of the present disclosure, each optical fiber ribbon of the plurality of optical fiber ribbons 102 is a bendable ribbon. In general, bendable ribbons bend along non-preferential axis. Also, the bendable ribbons may be used to change stacking method of the arrangement of the plurality of optical fiber ribbons 102. In general, the bendable ribbons are packed efficiently inside a loose tube. In an embodiment of the present disclosure, the plurality of optical fiber ribbons 102 is efficiently packed inside the buffer tube 100. The efficient packing of the plurality of optical fiber ribbons 102 inside the buffer tube 100 reduces overall diameter of any cable during installation of the buffer tube 100 in the particular cable.

The plurality of optical fiber ribbons 102 is arranged in a plurality of circular arcs 104. In an embodiment of the present disclosure, the plurality of circular arcs 104 is concentric. In an embodiment of the present disclosure, the plurality of circular arcs 104 is in a buffer tube 100. In another embodiment of the present disclosure, the buffer tube 100 may be replaced by aramid yarns or any other kind of yarns. In another embodiment of the present disclosure, the buffer tube 100 may be replaced by and the plurality of optical fiber ribbons 102 are wrapped with one or more of one or more yarns, one or more binders, one or more tapes and one or more layers.

In an embodiment of the present disclosure, number of the one or more layers of the plurality of optical fiber ribbons 102 inside the buffer tube 100 is 6. Each layer of the one or more layers consists of a bendable ribbon arranged in a circular arc fashion. In an embodiment of the present disclosure, the one or more layers include a first layer, a second layer, a third layer, a fourth layer, a fifth layer and a sixth layer. In an embodiment of the present disclosure, the first layer and the second layer includes one optical fiber ribbon each. In addition, the third layer and the fourth layer include two optical fiber ribbons each. Further, the fifth layer and the sixth layer include three optical fiber ribbons each. Furthermore, total number of the plurality of optical fiber ribbons 102 inside the buffer tube 100 is twelve.

In yet another embodiment of the present disclosure, number of the one or more layers of the optical fiber ribbon stack 102 inside the buffer tube 100 may vary. In an embodiment of the present disclosure, each layer of the one or more layers of the optical fiber ribbon stack 102 inside the buffer tube 100 may have any number of optical fiber ribbons. In an embodiment of the present disclosure, packing ratio of the buffer tube 100 may vary depending upon number of the plurality of optical fiber ribbons inside the buffer tube 100.

In an embodiment of the present disclosure, each layer of the one or more layers is characterized by a diameter. The diameter of each layer of the one or more layers is different. In an example, number of the one or more layers of the optical fiber ribbon stack is three. The one or more layers include the first layer, the second layer and the third layer. The third layer surrounds the second layer. The second layer surrounds the first layer. Furthermore, the third layer has greater diameter than the first layer and the second layer. Moreover, the second layer has diameter greater than the first layer and smaller than the third layer. In addition, the first layer has smaller diameter than the second layer and the third layer.

In an embodiment of the present disclosure, the plurality of optical fiber ribbons 102 includes a plurality of optical fibers. Each optical fiber of the plurality of optical fibers has a diameter in the range of 160 to 250 micrometers. In general, an optical fiber refers to a medium associated with transmission of information over long distances in the form of light pulses. In addition, the optical fiber uses light to transmit voice and data communications over long distances. In an embodiment of the present disclosure, number of the optical fibers in each of the plurality of optical fiber ribbons 102 is 12. In another embodiment of the present disclosure, number of the optical fibers in each of the plurality of optical fiber ribbons 102 is 16. In yet another embodiment of the present disclosure, number of the optical fibers in each of the plurality of optical fiber ribbons 102 is 24. In yet another embodiment of the present disclosure, number of the optical fibers in each of the plurality of optical fiber ribbons 102 may vary.

In an embodiment of the present disclosure, the plurality of optical fiber ribbons 102 are designed and arranged for optical fiber cables in which high fiber counts are required with high fiber density.

Figure 2:
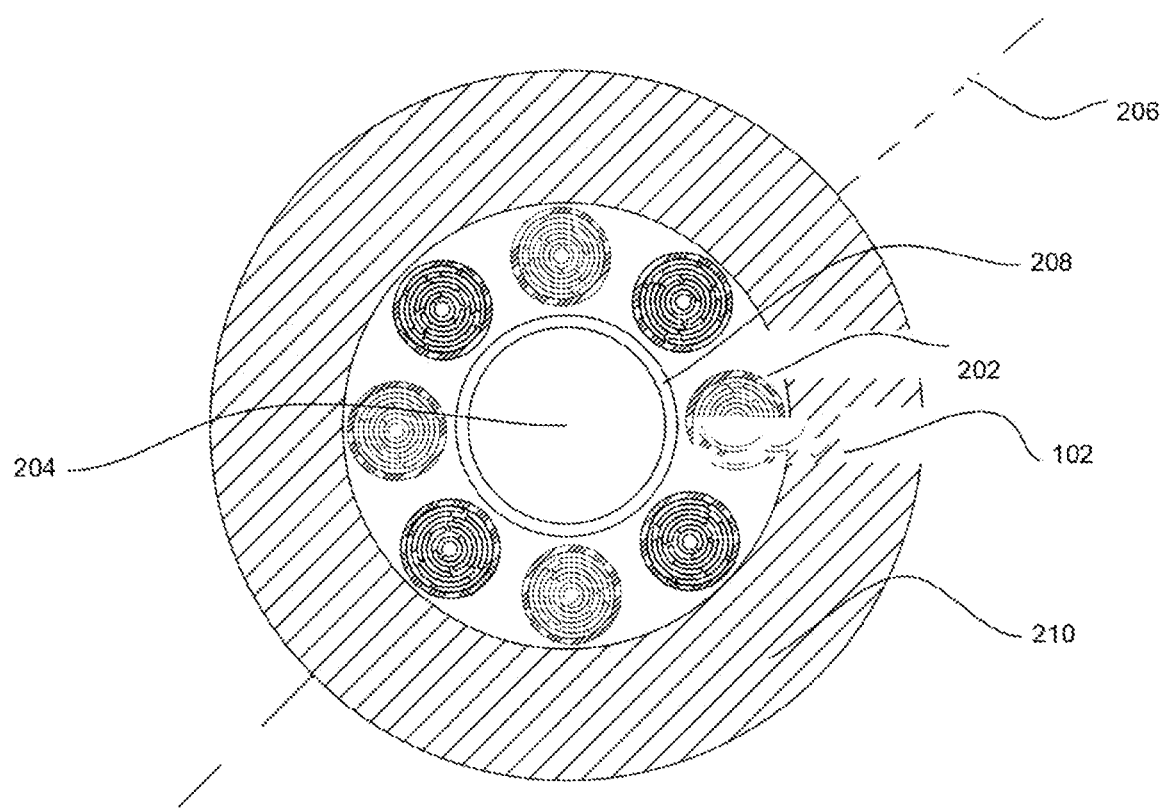
FIG. 2 illustrates an optical fiber cable with the plurality of optical fiber ribbons of the FIG. 1, in accordance with another embodiment of the present disclosure.

FIG. 2 illustrates an optical fiber cable 200 with the plurality of optical fiber ribbons 102 of FIG. 1, in accordance with another embodiment of the present disclosure. The optical fiber cable 200 is defined along a longitudinal axis 206 passing through a geometrical center 204 of the optical fiber cable 200. The longitudinal axis 206 of the optical fiber cable 200 is an imaginary axis along lengthwise direction of the optical fiber cable 200. The geometrical center 204 of the optical fiber cable 200 is a central point of the optical fiber cable 200. In other words, the geometrical center 204 of the optical fiber cable 200 is defined as a midpoint of diameter of the optical fiber cable 200.

The optical fiber cable 200 includes the plurality of optical fiber ribbons 102 and a jacket 210. The jacket 210 encloses the plurality of optical fiber ribbons 102. The plurality of optical fiber ribbons 102 are positioned inside a core of the optical fiber cable 200. In an embodiment of the present disclosure, other additional elements such as buffer tubes, binders, tapes, yarns and the like may or may not be present inside the optical fiber cable 200. The plurality of optical fiber ribbons 102 are arranged in the plurality of circular arcs 104 in the optical fiber cable 200. The plurality of circular arcs 104 is substantially parallel.

In an embodiment of the present disclosure, the optical fiber cable 200 may include one or more of one or more buffer tubes 202. In an embodiment of the present disclosure, the plurality of optical fiber ribbons 102 may be enclosed in the one or more buffer tubes 202. In another embodiment of the present disclosure, the plurality of optical fiber ribbons 102 may not be enclosed in the one or more buffer tubes 202. In an embodiment of the present disclosure, the optical fiber cable 200 may include one or more of one or more binding yarns and one or more binding tapes. In an embodiment of the present disclosure, the one or more of the one or more binding yarns and the one or more binding tapes may be wound around the one or more buffer tubes 202. In an embodiment of the present disclosure, the optical fiber cable 200 further includes one or more of one or more yarns, one or more binders, one or more tapes and one or more layers. The one or more of the one or more yarns, the one or more binders, the one or more tapes and the one or more layers wraps the plurality of optical fiber ribbons. Further, each of the one or more buffer tubes 202 provides protection to the plurality of optical fiber ribbons 102 from physical damage. Each of the one or more buffer tubes 202 corresponds to the buffer tube 100 shown in FIG. 1. In an embodiment of the present disclosure, cross section of each buffer tube 100 of the one or more buffer tubes 202 is circular in shape. In another embodiment of the present disclosure, shape of the one or more buffer tubes 202 may vary. In an embodiment of the present disclosure, each buffer tube 100 of the one or more buffer tubes 202 is similar in structure and dimensions.

In an embodiment of the present disclosure, number of the one or more buffer tubes 202 in the optical fiber cable 200 is 1. In addition, total number of the plurality of optical fibers corresponding to 1 buffer tube in the optical fiber cable 200 is 192. Further, fiber density corresponding to 192 optical fibers in the optical fiber cable 200 is 12.07. In another embodiment of the present disclosure, number of the one or more buffer tubes 202 in the optical fiber cable 200 is 6. Further, total number of the plurality of optical fibers corresponding to 6 buffer tubes in the optical fiber cable 200 is 1152. Furthermore, fiber density corresponding to 1152 optical fibers in the optical fiber cable 200 is 4.24. In yet another embodiment of the present disclosure, number of the one or more buffer tubes 202 in the optical fiber cable 200 is 12. Moreover, total number of the plurality of optical fibers corresponding to 12 buffer tubes in the optical fiber cable 200 is 2304. Also, fiber density corresponding to 2304 optical fibers in the optical fiber cable 200 is 5.36. In yet another embodiment of the present disclosure, number of the one or more buffer tubes 202 in the optical fiber cable 200 is 24. Moreover, total number of the plurality of optical fibers corresponding to 12 buffer tubes in the optical fiber cable 200 is 4608. Also, fiber density corresponding to 4608 optical fibers in the optical fiber cable 200 is 6.23. In yet another embodiment of the present disclosure, number of the one or more buffer tubes 202 in the optical fiber cable 200 is 48. Also, total number of the plurality of optical fibers corresponding to 48 buffer tubes in the optical fiber cable 200 is 9216. Also, fiber density corresponding to 9216 optical fibers in the optical fiber cable 200 is 7.23.

In yet another embodiment of the present disclosure, number of the one or more buffer tubes 202 in the optical fiber cable 200 may vary. In an embodiment of the present disclosure, total number of the plurality of optical fibers in the optical fiber cable 200 may vary.

Figure 3:
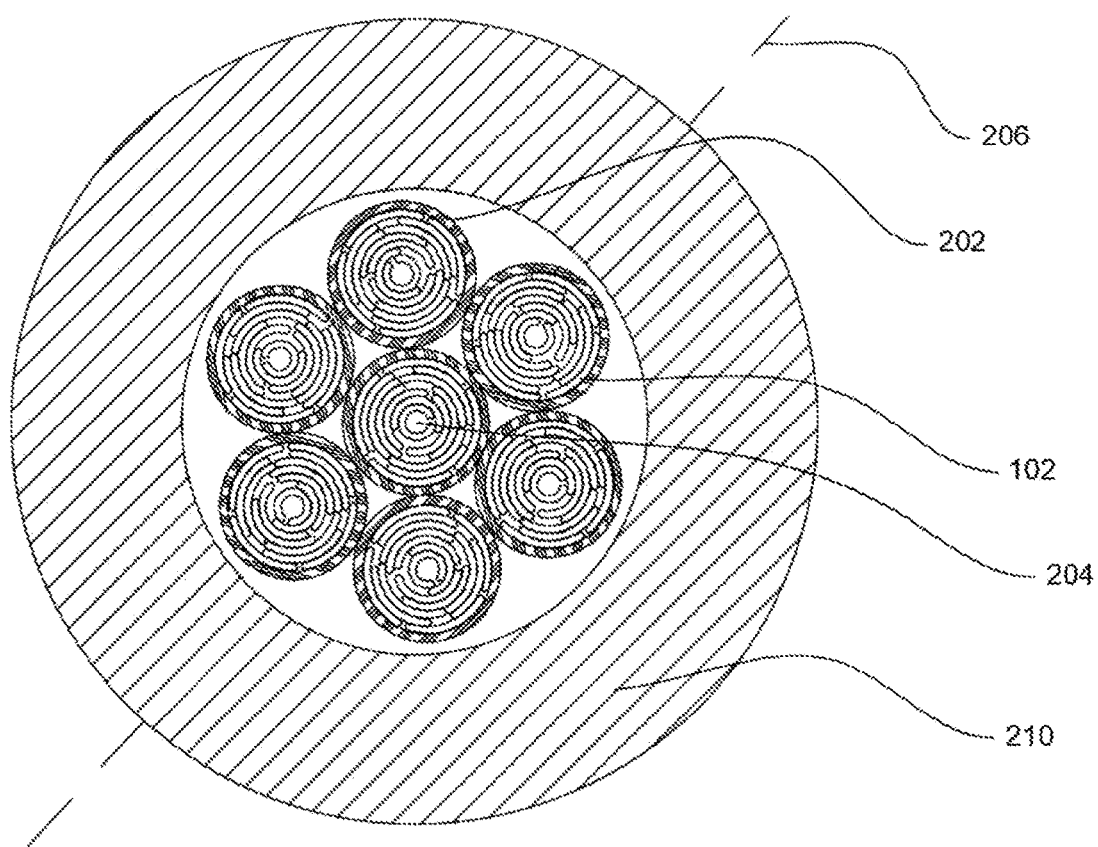
FIG. 3 illustrates another example of the optical fiber cable with the optical fiber ribbon stack of FIG. 1, in accordance with another embodiment of the present disclosure.

In an embodiment of the present disclosure, the optical fiber cable 200 includes a central strength member 208. The one or more buffer tubes 202 surround the central strength member 208. In general, central strength member provides physical strength to a fiber cable and resists over bending of the fiber cable. In an embodiment of the present disclosure, the central strength member 208 provides tensile strength to the optical fiber cable 200. In another embodiment of the present disclosure, the optical fiber cable 200 may not include central strength member (as shown in FIG. 3).

Furthermore, the optical fiber cable 200 includes the jacket 210. The jacket 210 encloses the plurality of optical fiber ribbons 102. In an embodiment of the present disclosure, the jacket 210 surrounds the one or more buffer tubes 202. In an embodiment of the present disclosure, the jacket 210 protects the optical fiber cable 200 against crush, pressure and tensile stress. In addition, the jacket 210 provides stiffness, rigidity, and resistance to the optical fiber cable 200.

The plurality of optical fiber ribbons 102 is stacked inside the optical fiber cable 200 according to a method. The method includes a set of steps. The set of steps include a first step of receiving the plurality of optical fiber ribbons 102. Moreover, the set of steps include a second step of arranging the plurality of optical fiber ribbons 102 in the plurality of circular arcs 104 in the optical fiber cable 200. The plurality of circular arcs 104 is substantially parallel. In an embodiment of the present disclosure, each of the plurality of optical fiber ribbons 102 is arranged concentrically.

In an embodiment of the present disclosure, each circular arc of the plurality of circular arcs 104 is in contact with at least one circular arc of the plurality of circular arcs 104. In an embodiment of the present disclosure, the step of arranging the plurality of optical fiber ribbons 102 further includes placing the plurality of optical fiber ribbons 102 such that at least one of a top surface and a bottom surface of each optical fiber ribbon of the plurality of optical fiber ribbons 102 is in contact with at least one optical fiber ribbon of the plurality of optical fiber ribbons 102.

In an embodiment of the present disclosure, the plurality of optical fiber ribbons 102 are arranged such that placement of each optical fiber ribbon is defined by a radius and a radius of curvature. The placement of each optical fiber ribbon of the plurality of optical fiber ribbons 102 is defined by a first radius of curvature. In an embodiment of the present disclosure, an optical fiber ribbon defined by a first radius is not in contact with other optical fiber ribbon defined by the first radius.

FIG. 3 illustrates another example of the optical fiber cable 200 with the optical fiber ribbon stack of FIG. 1, in accordance with another embodiment of the present disclosure. The optical fiber cable 200 (as shown in FIG. 3) is similar to the optical fiber cable 200 (as shown in FIG. 2) but does not include a central strength member.

The optical fiber ribbon stack 102 enclosed in the buffer tube 100 may be installed in any type of optical fiber cable. In general, types of optical fiber cable include armored optical fiber cable, fire retardant optical fiber cable, multi-loose tube optical fiber cable, high density optical fiber cable and the like. The optical fiber ribbons take less space inside the buffer tube 100 due to the arrangement of the optical fiber ribbons in concentric circular arcs in multiple layers inside the buffer tube 100. Also, the arrangement of the optical fiber ribbons in concentric circular arcs in multiple layers inside the buffer tube 100 allows more number of ribbons to be arranged inside the buffer tube 100. In addition, the arrangement of the optical fiber ribbons in concentric circular arcs in multiple layers inside multiple buffer tubes leads to increase in fiber density.

The buffer tube 100 includes the optical fiber ribbon stack 102. The buffer tube 100 is a loose tube. Further, the ribbon stack 102 includes a plurality of optical fiber ribbons. In general, optical fiber ribbons are made of number of optical fibers bonded together. In an embodiment of the present disclosure, each ribbon of the plurality of optical fiber ribbons in the ribbon stack 102 is a bendable ribbon. In general, bendable ribbons are capable to bend along non-preferential axis. Also, the bendable ribbons may be used to change stacking method of the plurality of ribbons. In general, the bendable ribbons are packed efficiently inside a loose tube. In an embodiment of the present disclosure, the ribbon stack 102 is efficiently packed inside the buffer tube 100. The efficient packing of the optical fiber ribbon stack 102 inside the buffer tube 100 reduces overall diameter of any cable during installation of the buffer tube 100 in the particular cable.

In an embodiment of the present disclosure, the plurality of optical fiber ribbons in the optical fiber ribbon stack 102 is arranged inside the buffer tube 100 in concentric circular arcs in a number of layers. In another embodiment of the present disclosure, the plurality of optical fiber ribbons in the optical fiber ribbon stack is arranged inside the buffer tube 100 in any suitable arrangement of the like. Further, each layer includes at least one optical fiber ribbon arranged in a circular manner. In an embodiment of the present disclosure, each layer of the optical fiber ribbon stack may have any number of optical fiber ribbons. In another embodiment of the present disclosure, each layer of the optical fiber ribbon stack may have same number of optical fiber ribbons. In yet another embodiment of the present disclosure, each layer of the optical fiber ribbon stack may have different number of optical fiber ribbons. In an example, length of the plurality of optical fiber ribbons of each layer is different when each layer has same number of optical fiber ribbons. In another example, length of the plurality of optical fiber ribbons of each layer may be same or different when each layer has different number of the plurality of optical fiber ribbons.

In an embodiment of the present disclosure, the optical fiber ribbon stack is designed for optical fiber cables in which high fiber counts are required with high fiber density. In another embodiment of the present disclosure, the optical fiber ribbon stack is designed for optical fiber cables in which lower fiber counts are required. In yet another embodiment of the present disclosure, the design of the ribbon stack depends on the type of application of the optical fiber cable.

The optical fiber ribbon stack 102 enclosed in the buffer tube 100 may be installed in any type of optical fiber cable. In general, types of optical fiber cable include single mode optical fiber cable, multimode optical fiber cable, armored optical fiber cable, high density optical fiber ribbons cable and the like. In addition, types of optical fiber cable include optical fiber cable with central strength member and optical fiber cable without central strength member.

The optical fiber ribbon stack has numerous advantages over the prior art. The optical fiber ribbon stack has high fiber density. The optical fiber ribbon stack is efficiently packed inside the buffer tube. The efficient packing of the optical fiber ribbon stack inside the buffer tube reduces overall diameter of the optical fiber cable. In addition, the efficient packing of optical fiber ribbon stack inside the buffer tube provides low point stresses on the plurality of optical fibers.

Figure 4:
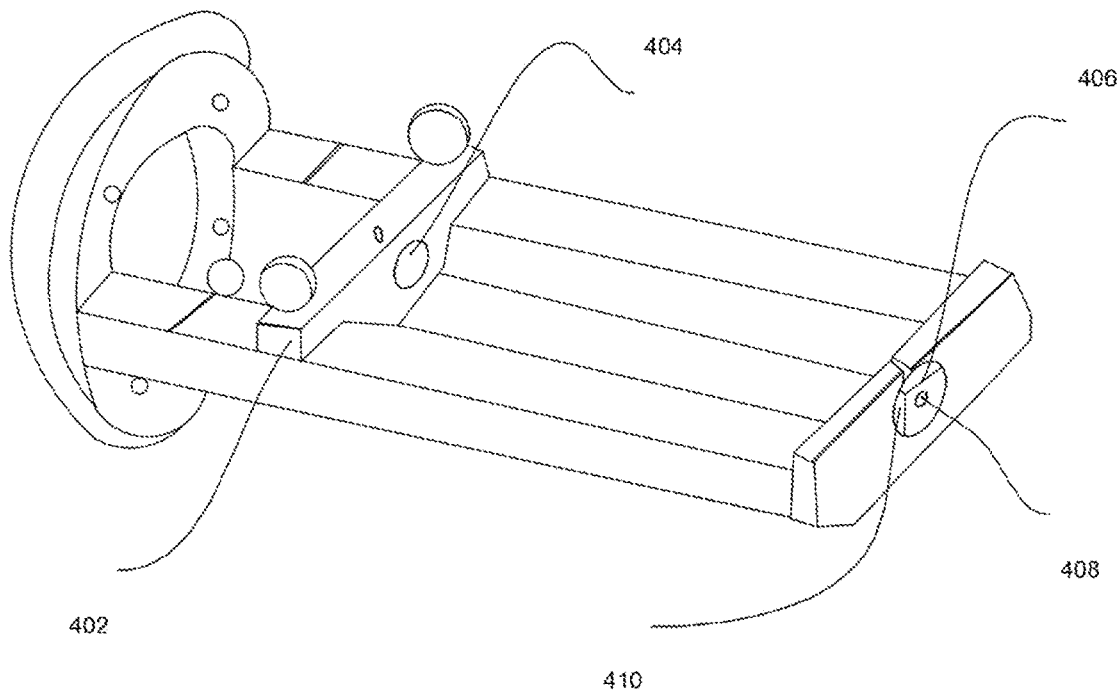
FIG. 4 illustrates a cross sectional view of a machine holder, in accordance with various embodiments of the present disclosure.

FIG. 4 illustrates a general overview of a machine holder 400, in accordance with various embodiments of the present disclosure. The machine holder 400 guides a plurality of bendable optical fiber ribbons into a concentric circular form. The machine holder 100 includes a lay plate holder 402, a lay plate 404, a master die holder 406, a master die 408 and a guide 410. The lay plate holder 402, the lay plate 404, the master die holder 106, the master die 108 and the guide 110 are arranged to enable movement of the plurality of bendable optical fiber ribbons in a concentric circular direction. The machine holder 400 is utilized to manufacture the optical fiber ribbon stack 102 of FIG. 1.

In an embodiment of the present disclosure, the lay plate 404 is utilized to hold a plurality of optical fiber ribbons. In addition, the plurality of optical fiber ribbons is inserted into the lay plate 404. In general, optical fiber ribbons include a number of optical fibers arranged together within a matrix material. In addition, multiple individual optical ribbons can be stacked into a bundle to form a ribbon stack. Further, each of the plurality of optical fiber ribbons includes a plurality of optical fibers. In general, an optical fiber refers to a medium associated with transmission of information over long distances in the form of light pulses. In addition, the optical fiber uses light to transmit voice and data communications over long distances. Further, each of the plurality of optical fiber ribbons is a bendable ribbon. In general, bendable ribbons are capable to bend along non-preferential axis. Also, the bendable ribbons may be used to change stacking method of the plurality of optical fiber ribbons.

The lay plate 404 is mounted inside the machine holder 400 with facilitation of the lay plate holder 402. The lay plate holder 402 holds the lay plate 404 in the machine holder 400. In an embodiment of the present disclosure, the lay plate 404 is fixed in the lay plate holder 402. The lay plate 404 is circular in shape. In an embodiment of the present disclosure, shape of the lay plate 404 may vary. The lay plate 404 includes a plurality of slots. In an embodiment of the present disclosure, the plurality of optical fiber ribbons is placed in the lay plate 404. The plurality of slots is utilized for holding the plurality of bendable optical fiber ribbons in the lay plate 404. Each ribbon of the plurality of optical fiber ribbons is placed in an individual slot of the plurality of slots of the lay plate 404. In an embodiment of the present disclosure, number of the plurality of slots in the lay plate 404 is in range of about 6 to 72. In another embodiment of the present disclosure, number of the plurality of slots in the lay plate 404 is in range of about 12 to 36. In yet another embodiment of the present disclosure, range of number of the plurality of slots in the lay plate 404 may vary according to number of optical fiber ribbons. The plurality of slots in the lay plate 404 is designed in shape of concentric circular or spiral arcs. The plurality of bendable optical fiber ribbons is arranged into concentric circular or spiral arcs with facilitation of the lay plate 404. In addition, the plurality of optical fiber ribbons is arranged into concentric circular arcs with facilitation of the lay plate 404.

Further, the plurality of optical fiber ribbons arranged into concentric circular arcs is passed through the master die 408. The plurality of optical fiber ribbons take desired bendable shape in concentric form after passing through the master die 408. The structure of the master die 408 allows the plurality of optical fiber ribbons to take desirable bendable shape in concentric form. In an embodiment of the present disclosure, the plurality of optical fiber ribbons forms an optical fiber ribbon stack after passing through the master die 408. The master die 408 is placed in the machine holder 400. The master die 408 is placed in the machine holder 400 with facilitation of the master die holder 406. In an embodiment of the present disclosure, the master die 408 is placed along with the guide 410 mounted inside the master die holder 406. The master die holder 406 holds the master die 408 in fixed position. In an embodiment of the present disclosure, the master die 408 includes a plurality of grooves. In addition, number of the plurality of grooves in the master die 408 is in range of about 6 to 72. In an embodiment of the present disclosure, range of number of the plurality of grooves in the master die 408 may vary.

Furthermore, the optical fiber ribbon stack passes through the guide 410. In an embodiment of the present disclosure, the guide 410 surrounds the master die 408. The guide 410 is positioned along with the master die 408 in the master die holder 406. In an embodiment of the present disclosure, the guide 410 has cylindrical shape. In another embodiment of the present disclosure, shape of the guide 410 may vary. The guide 410 facilitates in compaction of the plurality of optical fiber ribbons of the optical fiber ribbon stack in desired concentric shape. In an embodiment of the present disclosure, the plurality of optical fiber ribbons is arranged concentrically by the guide 410. Moreover, the optical fiber ribbon stack of desired concentric shape comes out of the guide 410. In an embodiment of the present disclosure, the optical fiber ribbon stack coming out of the guide 410 is wrapped around smooth rectangular shaped paper tape. The paper tape maintains integrity of the optical fiber ribbon stack.

In an embodiment of the present disclosure, the plurality of bendable optical fiber ribbons passes from the master die 408. In an embodiment of the present disclosure, the plurality of bendable optical fiber ribbons forms an optical fiber ribbon stack after passing through the master die 408. In an embodiment of the present disclosure, the master die 408 is placed in the machine holder 400 at a distance of about 100 millimeter to 500 millimeter from the lay plate 404. The optical fiber ribbon stack is passed through a hollow cylindrical die. The hollow cylindrical die is present inside extruder head. In addition, extruder head has inner diameter equal to outer diameter of the optical fiber ribbon stack. In an embodiment of the present disclosure, the optical fiber ribbon stack passes through the hollow cylindrical die present inside extruder head. Further, the optical fiber ribbon stack is pushed inside a buffer tube.

The machine holder 400 enables production of high fiber count optical fiber cables with smaller diameter. The high fiber count is due to the arrangement of the optical fiber ribbons in concentric circular arcs in multiple layers inside the buffer tube. Also, the arrangement of the optical fiber ribbons in concentric circular arcs in multiple layers inside the buffer tube allows more number of ribbons to be arranged inside the buffer tube. In addition, the machine holder 400 enables lower mechanical stresses on the fibers inside the plurality of bendable optical fiber ribbons. Moreover, the stresses are reduced due to the arrangement of the optical fiber ribbons in concentric circular arcs in multiple layers inside the buffer tube. Further, the machine holder 100 enables highly packed buffer tubes with large number of optical fibers and high fiber density in same cable diameter due to the concentric arrangement.

Figure 5:
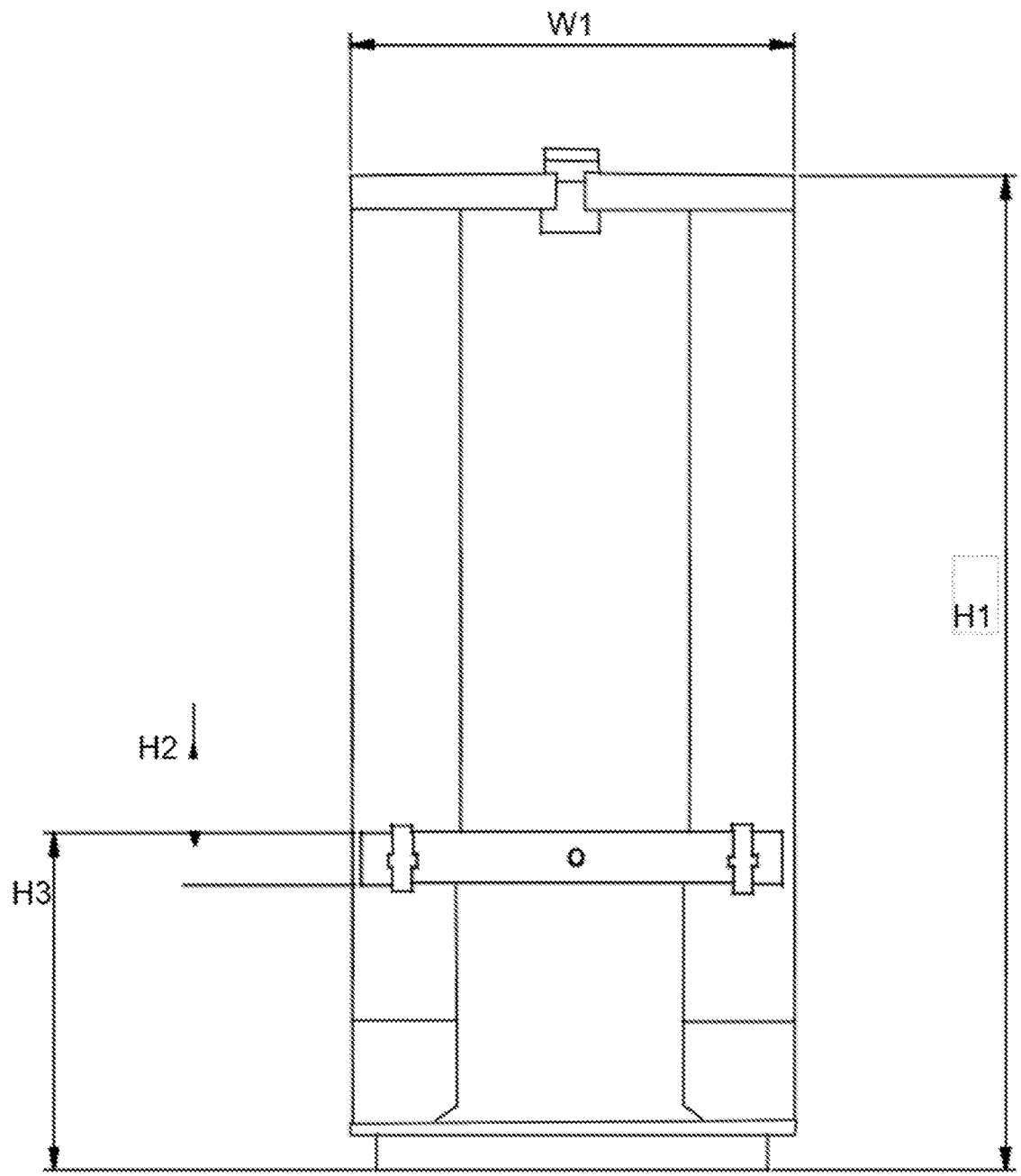
FIG. 5 illustrates a side view of the machine holder, in accordance with an embodiment of the present disclosure.

FIG. 5 illustrates a side view of the machine holder 400, in accordance with an embodiment of the present disclosure. In an embodiment of the present disclosure, the machine holder 400 has a height H1 of about 365.00 mm. In another embodiment of the present disclosure, the height H1 of the machine holder 400 may vary. In an embodiment of the present disclosure, the machine holder 400 has a width W1 of about 167.14 mm. In another embodiment of the present disclosure, the width W1 of the machine holder 400 may vary. In an embodiment of the present disclosure, the lay plate holder 402 has a height H2 of about 20.00 mm. In another embodiment of the present disclosure, the height H2 of the lay plate holder 402 may vary. In an embodiment of the present disclosure, the lay plate holder 402 is placed at the machine holder 400 at height H3 of about 131.00 mm. In another embodiment of the present disclosure, the height H3 of the lay plate holder 402 at the machine holder 400 may vary.

Figure 6:
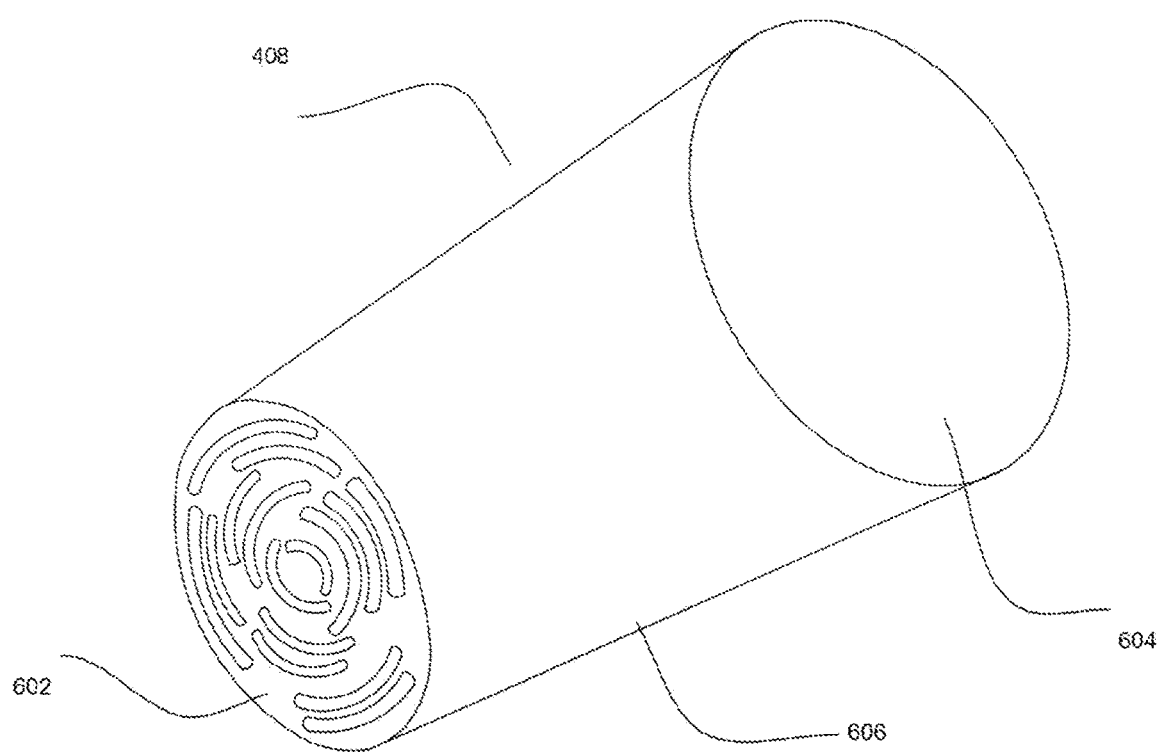
FIG. 6 illustrates a general overview of a master die, in accordance with an embodiment of the present disclosure.

FIG. 6 illustrates a general overview 600 of the master die 408, in accordance with an embodiment of the present disclosure. The master die 408 includes a first end 602, a second end 604 and a main body 606. The main body 606 of the master die 408 is positioned between the first end 602 of the master die 408 and the second end 604 of the master die 408. The master die 408 has cylindrical shape extending from the first end 602 to the second end 604. In an embodiment of the present disclosure, the master die 408 includes the plurality of grooves. In addition, the plurality of grooves extends from the first end 602 of the master die 408 to the second end 604 of the master die 408. In an embodiment of the present disclosure, the plurality of grooves of the master die 408 has shape of concentric circular arcs. In another embodiment of the present disclosure, the shape of the plurality of grooves of the master die 408 may vary. In an embodiment of the present disclosure, the plurality of grooves is arranged in one or more layers. In addition, the one or more layers include a first layer, a second layer, a third layer, and a fourth layer. In another embodiment of the present disclosure, number of the one or more layers may vary.

Figure 7:
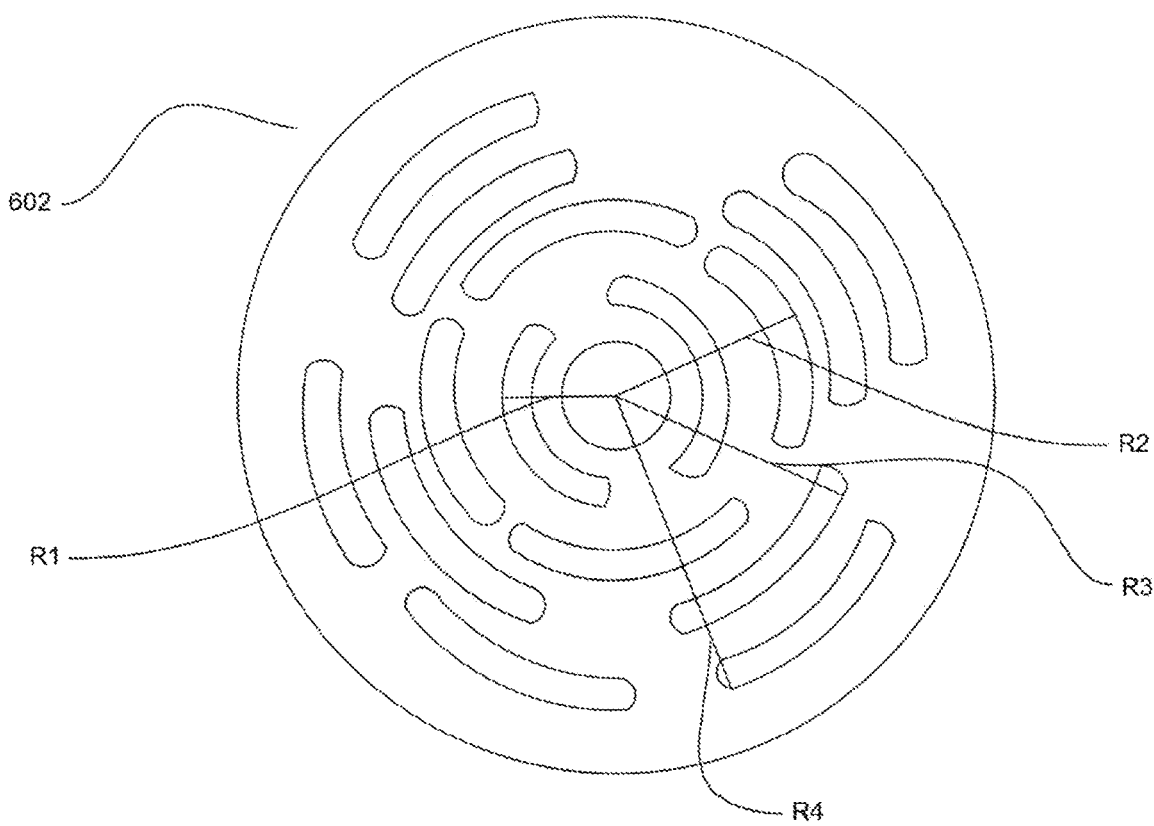
FIG. 7 illustrates an internal cross sectional view of a first end of the master die, in accordance with an embodiment of the present disclosure.

FIG. 7 illustrates an internal cross sectional view 700 of the first end 602 of the master die 408, in accordance with an embodiment of the present disclosure. The first end 602 of the master die 408 includes the one or more layers of the plurality of grooves. In an embodiment of the present disclosure, the one or more layers of the plurality of grooves in the first end 602 of the master die 408 includes the first layer, the second layer, the third layer and the fourth layer. In another embodiment of the present disclosure, number of the one or more layer of the plurality of grooves in the first end 602 of the master die 408 may vary. In an embodiment of the present disclosure, the first layer of the plurality of grooves of the first end 602 of the master die 408 has a radius R1 of about 28. In another embodiment of the present disclosure, the radius R1 of the first layer of the plurality of grooves of the first end 602 of the master die 408 may vary. In an embodiment of the present disclosure, the second layer of the plurality of grooves of the first end 602 of the master die 408 has a radius R2 of about 33. In another embodiment of the present disclosure, the radius R2 of the second layer of the plurality of grooves of the first end 602 of the master die 408 may vary. In an embodiment of the present disclosure, the third layer of the plurality of grooves of the first end 602 of the master die 408 has a radius R3 of about 38. In another embodiment of the present disclosure, the radius R3 of the third layer of the plurality of grooves of the first end 602 of the master die 408 may vary. In an embodiment of the present disclosure, the fourth layer of the plurality of grooves of the first end 602 of the master die 408 has a radius R4 of about 43. In another embodiment of the present disclosure, the radius R4 of the fourth layer of the plurality of grooves of the first end 602 of the master die 408 may vary. Further, the fourth layer of the plurality of grooves of the first end 602 of the master die 408 is explained further in FIG. 9.

Figure 8:
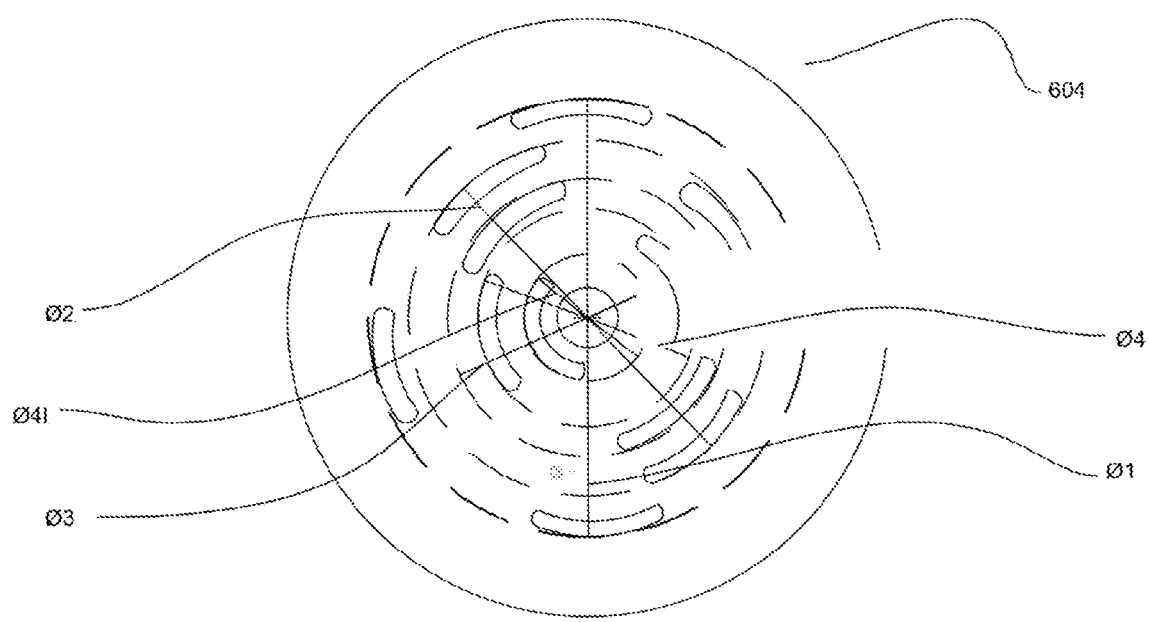
FIG. 8 illustrates an internal cross sectional view of a second end of the master die, in accordance with an embodiment of the present disclosure.

FIG. 8 illustrates an internal cross sectional view 800 of the second end 604 of the master die 408, in accordance with an embodiment of the present disclosure. The second end 604 of the master die 408 includes the one or more layers of the plurality of grooves. In an embodiment of the present disclosure, the one or more layers of the plurality of grooves in the second end 604 of the master die 408 includes the first layer, the second layer, the third layer and the fourth layer. In another embodiment of the present disclosure, number of the one or more layer of the plurality of grooves in the second end 604 of the master die 408 may vary. In an embodiment of the present disclosure, the first layer of the plurality of grooves of the second end 604 of the master die 408 has a radius of about 80. In another embodiment of the present disclosure, the radius of the first layer of the plurality of grooves of the second end 604 of the master die 408 may vary. In an embodiment of the present disclosure, the second layer of the plurality of grooves of the second end 604 of the master die 408 has a radius of about 85. In another embodiment of the present disclosure, the radius of the second layer of the plurality of grooves of the second end 304 of the master die 108 may vary. In an embodiment of the present disclosure, the third layer of the plurality of grooves of the second end 604 of the master die 408 has a radius of about 90. In another embodiment of the present disclosure, the radius of the third layer of the plurality of grooves of the second end 604 of the master die 408 may vary.

In an embodiment of the present disclosure, the first layer of the plurality of grooves of the second end 604 of the master die 408 has a diameter $Ø_1$ of about 5.18. In another embodiment of the present disclosure, the diameter $Ø_1$ of the first layer of the plurality of grooves of the second end 604 of the master die 408 may vary. In an embodiment of the present disclosure, the second layer of the plurality of grooves of the second end 604 of the master die 408 has a diameter $Ø_2$ of about 8.58. In another embodiment of the present disclosure, the diameter $Ø_2$ of the second layer of the plurality of grooves of the second end 604 of the master die 408 may vary. In an embodiment of the present disclosure, the third layer of the plurality of grooves of the second end 604 of the master die 408 has a diameter $Ø_3$ of about 11.04. In another embodiment of the present disclosure, the diameter $Ø_3$ of the third layer of the plurality of grooves of the second end 604 of the master die 408 may vary. In an embodiment of the present disclosure, the fourth layer of the plurality of grooves of the second end 604 of the master die 408 has a diameter $Ø_4$ of about 13.96. In another embodiment of the present disclosure, the diameter $Ø_4$ of the fourth layer of the plurality of grooves of the second end 604 of the master die 408 may vary. In an embodiment of the present disclosure, the fifth layer of the plurality of grooves of the second end 604 of the master die 408 has a diameter $Ø_5$ of about 17.16. In another embodiment of the present disclosure, the diameter $Ø_5$ of the fifth layer of the plurality of grooves of the second end 604 of the master die 408 may vary (as shown in FIG. 8). Further, the fifth layer of the plurality of grooves of the second end 604 of the master die 408 is explained further in FIG. 9.

Figure 9:
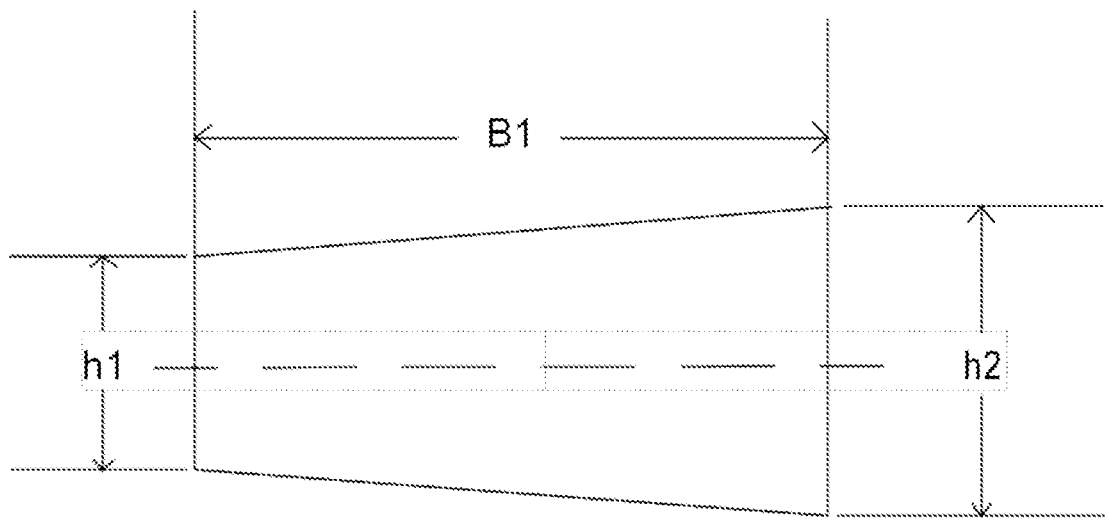
FIG. 9 illustrates an cross sectional view of a section of the master die, in accordance with an embodiment of the present disclosure.

FIG. 9 illustrates a cross section view 900 of a section of the master die 408, in accordance with an embodiment of the present disclosure. In an embodiment of the present disclosure, the master die 408 has a breadth B1 of about 15.00 mm. In another embodiment of the present disclosure, the breadth B1 of the master die 408 may vary. In an embodiment of the present disclosure, the first end 602 of the master die 408 has a height h1 of about 7.00 mm. In another embodiment of the present disclosure, the height h1 of the first die 602 of the master die 408 may vary. In an embodiment of the present disclosure, the second end 604 of the master die 408 has a height h2 of about 10.50 mm. In another embodiment of the present disclosure, the height h2 of the second end 604 of the master die 408 may vary.

Figure 10:
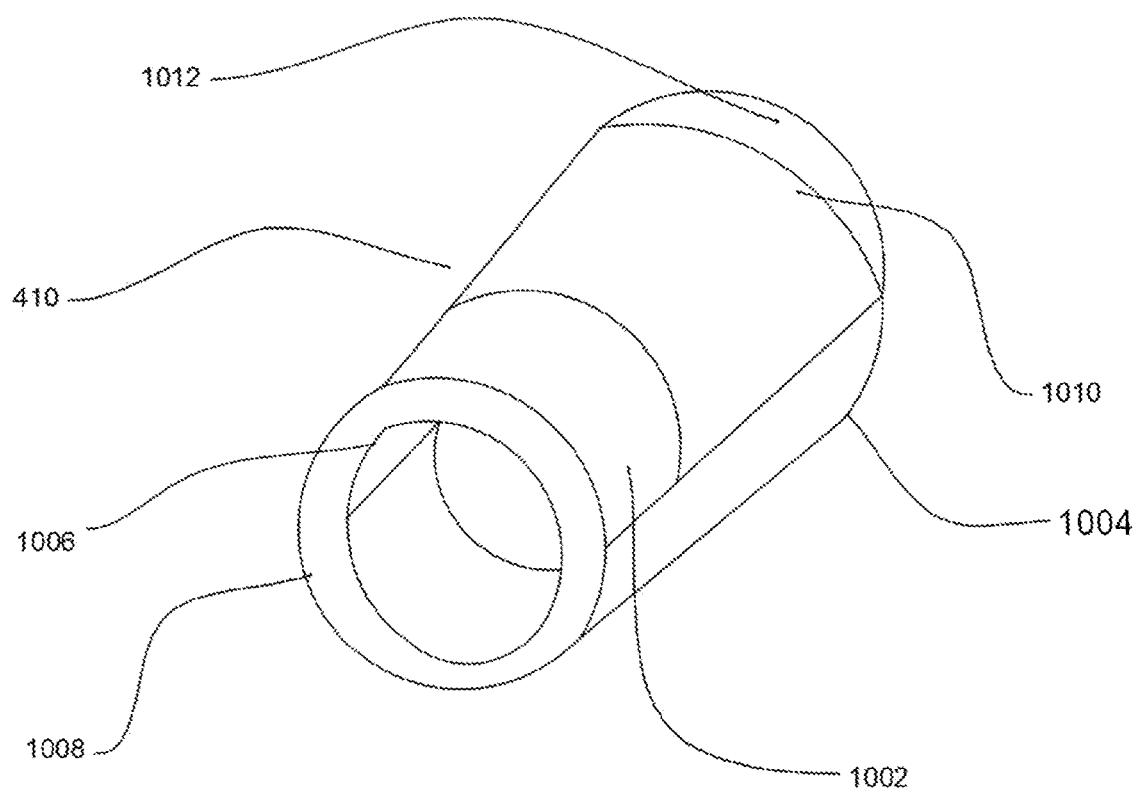
FIG. 10 illustrates a general overview of a guide, in accordance with an embodiment of the present disclosure.

FIG. 10 illustrates a general overview 1000 of the guide 410, in accordance with an embodiment of the present disclosure. The guide 410 is positioned along with the master die 408 in the master die holder 406. The guide 410 includes a first region 1002 and a second region 1004. In an embodiment of the present disclosure, the first region 1002 is cylindrical in shape. In another embodiment of the present disclosure, the first region 1002 is of any suitable shape. In an embodiment of the present disclosure, the second region 1004 is cylindrical in shape. In another embodiment of the present disclosure, the second region 1004 is of any suitable shape.

Figure 11:
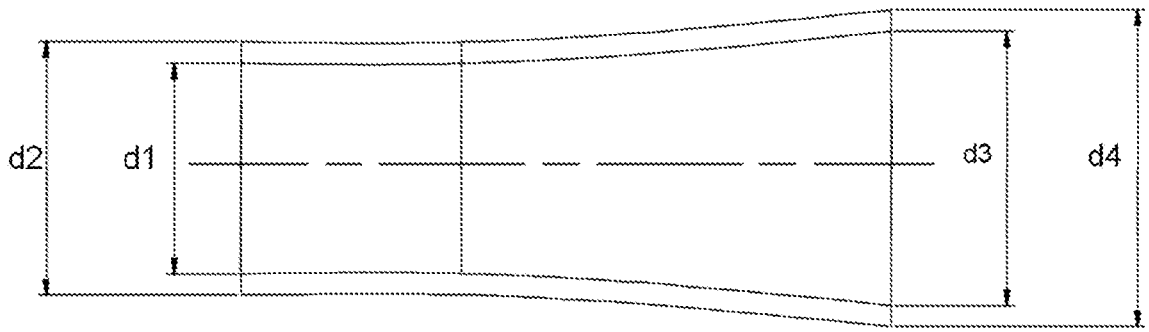
FIG. 11 illustrates an internal view of a section of the guide, in accordance with an embodiment of the present disclosure.

FIG. 11 illustrates an internal view 1100 of a section of a guide 410, in accordance with an embodiment of the present disclosure. Further, the first region 1002 includes an inner cylinder 1006 and an outer cylinder 1008 (as shown in FIG. 10). In an embodiment of the present disclosure, the inner cylinder 1006 has a diameter d1 of about 4.50 mm. In another embodiment of the present disclosure, the diameter d1 of the inner cylinder 1006 may vary. In an embodiment of the present disclosure, the outer cylinder 1008 has a diameter d2 of about 5.90 mm. In another embodiment of the present disclosure, the diameter d2 of the outer cylinder 1008 may vary. Furthermore, the second region 1004 includes a first cylinder 1010 and a second cylinder 1012 (as shown in FIG. 10). In an embodiment of the present disclosure, the first cylinder 1010 has a diameter d3 of about 5.90 mm. In another embodiment of the present disclosure, the diameter d3 of the first cylinder 1010 may vary. In an embodiment of the present disclosure, the second cylinder 1012 has a diameter d4 of about 7.00 mm. In another embodiment of the present disclosure, the diameter d4 of the second cylinder 1012 may vary.

Figure 12:
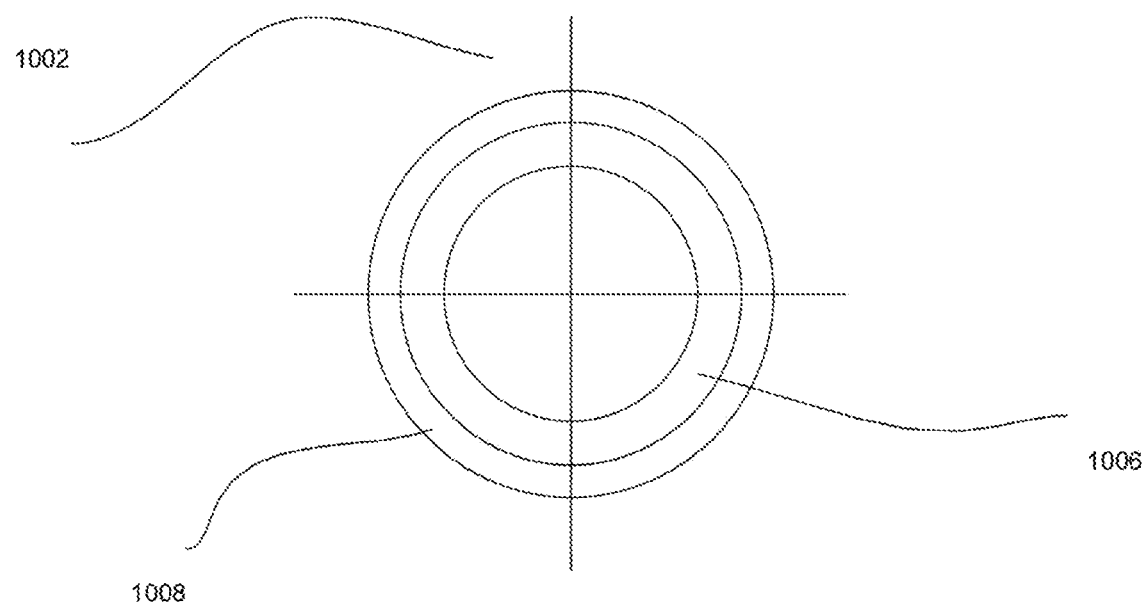
FIG. 12 illustrates a cross sectional view of a section of the guide, in accordance with an embodiment of the present disclosure.

FIG. 12 illustrates a general overview 1200 of inner section of the guide 410, in accordance with an embodiment of the present disclosure. In addition, FIG. 12 illustrates inner section of the first region 1002 of the guide 410. The first region 1002 includes the inner cylinder 1006 and the outer cylinder 1008 (as explained above).

Figure 13:
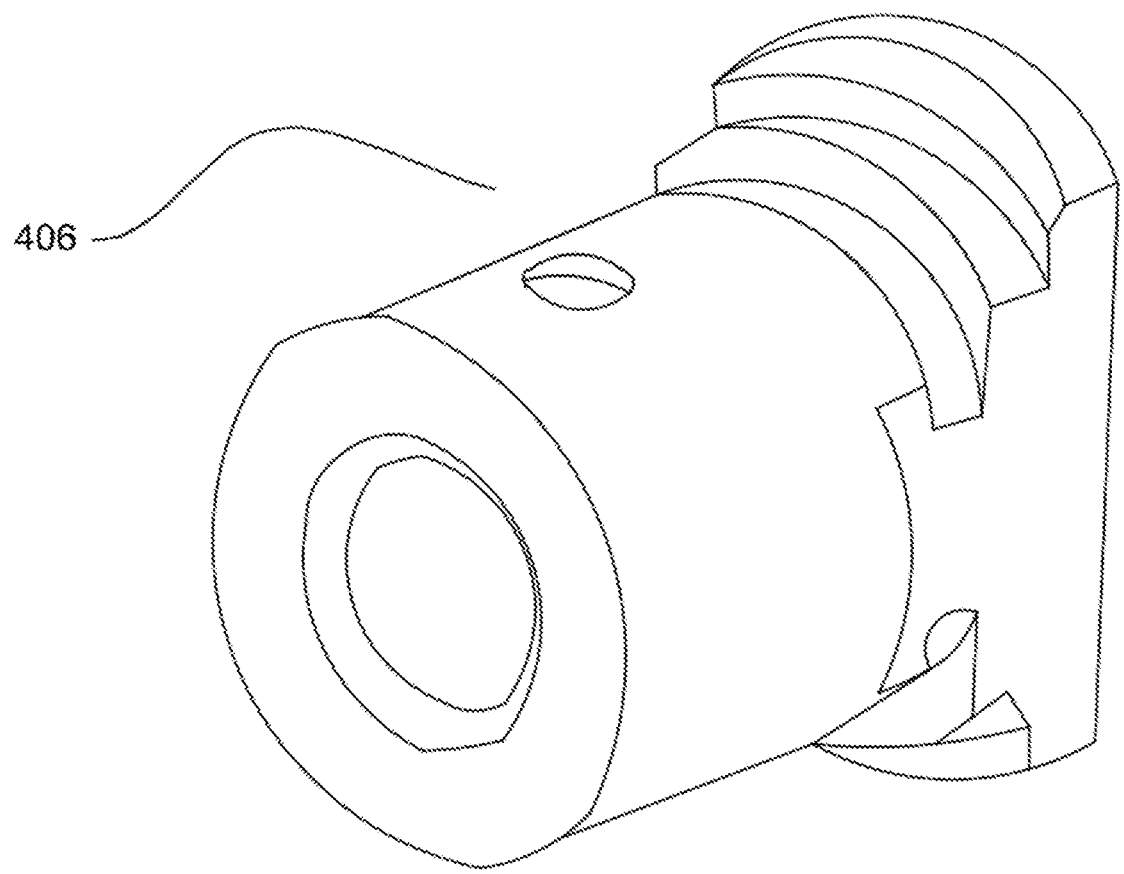
FIG. 13 illustrates a general overview of a master die holder, in accordance with an embodiment of the present disclosure.

FIG. 13 illustrates a general overview 1300 of the master die holder 406 of FIG. 1, in accordance with an embodiment of the present disclosure. The master die holder 406 holds the master die 408 in fixed position.

Figure 14:
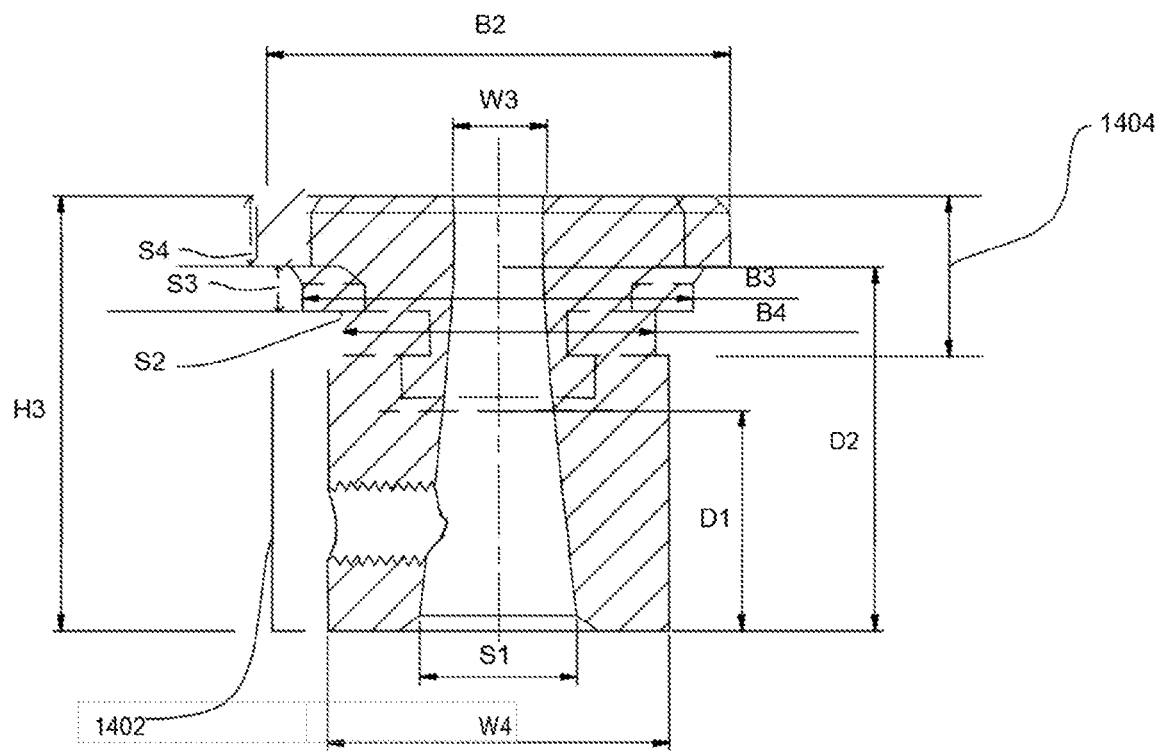
FIG. 14 illustrates a internal cross section view of the master die holder, in accordance with an embodiment of the present disclosure.

FIG. 14 illustrates an internal cross section view 1400 of the master die holder 406, in accordance with an embodiment of the present disclosure. In an embodiment of the present disclosure, the master die holder 406 has a height H3 of about 30.00 mm. In another embodiment of the present disclosure, the height H3 of the machine die holder 406 may vary. In addition, the machine die holder 406 includes bottom portion 1402, top portion 1404, a section S1 and a hole. The section S1 and a hole are positioned at the bottom portion 1402 of the master die holder 406. The top portion 1404 includes a section S2, a section S3, and a section S4. In an embodiment of the present disclosure, the bottom portion 1402 of the master die holder 406 has a width W4 of about 22.00 mm. In another embodiment of the present disclosure, the width W4 of the bottom portion 1402 of the master die holder 106 may vary. In an embodiment of the present disclosure, the section S2 of the top portion 1404 of the master die holder 406 has a breadth B4 of about 20.00 mm. In another embodiment of the present disclosure, the breadth B4 of the section S2 of the top portion 1104 of the master die holder 106 may vary. In an embodiment of the present disclosure, the section S3 of the top portion 1404 of the master die holder 406 has a breadth B3 of about 25.00 mm. In another embodiment of the present disclosure, the breadth B3 of the section S3 of the top portion 1404 of the master die holder 406 may vary. In an embodiment of the present disclosure, the section S3 of the top portion 1404 has a height of about 3.00 mm. In another embodiment of the present disclosure, the height of the section S3 of the top portion 1404 of the master die holder 406 may vary (as shown in FIG. 14).

In an embodiment of the present disclosure, the section S4 of the top portion 1404 of the master die holder 406 has a breadth B2 of about 30.00 mm. In another embodiment of the present disclosure, the breadth B2 of the section S4 of the top portion 1404 of the master die holder 406 may vary. In an embodiment of the present disclosure, the section S4 of the top portion 1404 of the master die 406 has a height of about 5.00 mm. In another embodiment of the present disclosure, the height of the section S4 of the top portion 1404 of the master die holder 406 may vary. (as shown in FIG. 14)

In an embodiment of the present disclosure, the section S1 has width of about 13.31 mm in accordance with the bottom portion 1402 of the machine die holder 406. In another embodiment of the present disclosure, width of the section S1 in accordance with the bottom portion 1402 of the machine die holder 406 may vary. In an embodiment of the present disclosure, the section S1 has a width W3 of about 5.90 mm in accordance with the top portion 1404 of the machine die holder 406. In another embodiment of the present disclosure, the width W3 of the section S1 in accordance with the top portion 1404 of the machine die holder 406 may vary. In an embodiment of the present disclosure, distance D1 between the section S1 and the section S2 is of about 15.02 mm. In another embodiment of the present disclosure, the distance D1 between the section S1 and the section S2 may vary. In an embodiment of the present disclosure, distance D2 between the section S1 and the section S3 is of about 25.00 mm. In another embodiment of the present disclosure, the distance D2 between the section S1 and the section S3 may vary. (as shown in FIG. 14)

Figure 15:
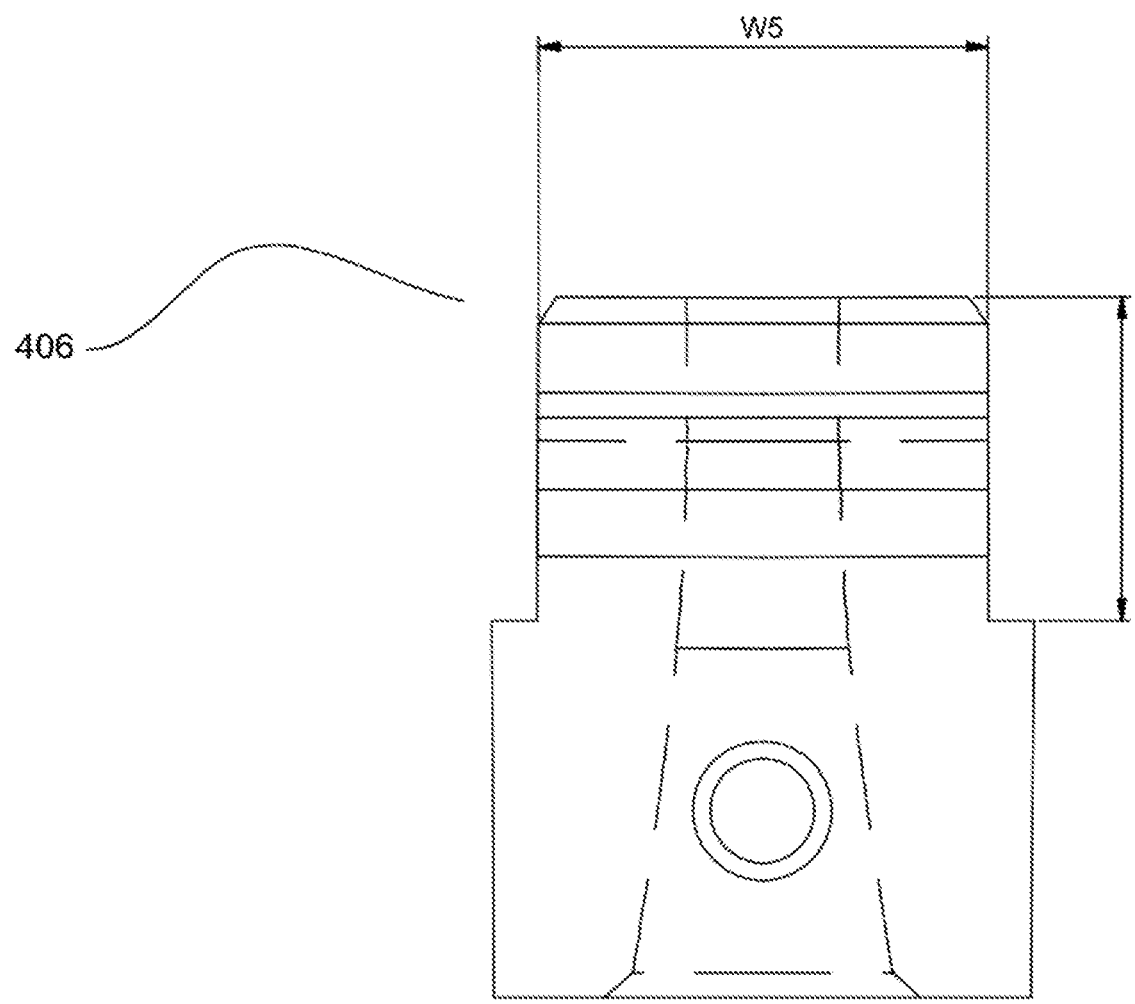
FIG. 15 illustrates a side view of the master die holder, in accordance with another embodiment of the present disclosure.

FIG. 15 illustrates a side view 1500 of the machine die holder 406, in accordance with another embodiment of the present disclosure. In an embodiment of the present disclosure, the machine die holder 406 has width W5 of about 18 mm. In another embodiment of the present disclosure, the width W5 of the machine die holder 406 may vary. In an embodiment of the present disclosure, the machine die holder 406 has a height H4 of about 14 mm. In another embodiment of the present disclosure, the height H4 of the machine die holder 406 may vary.

Figure 16:
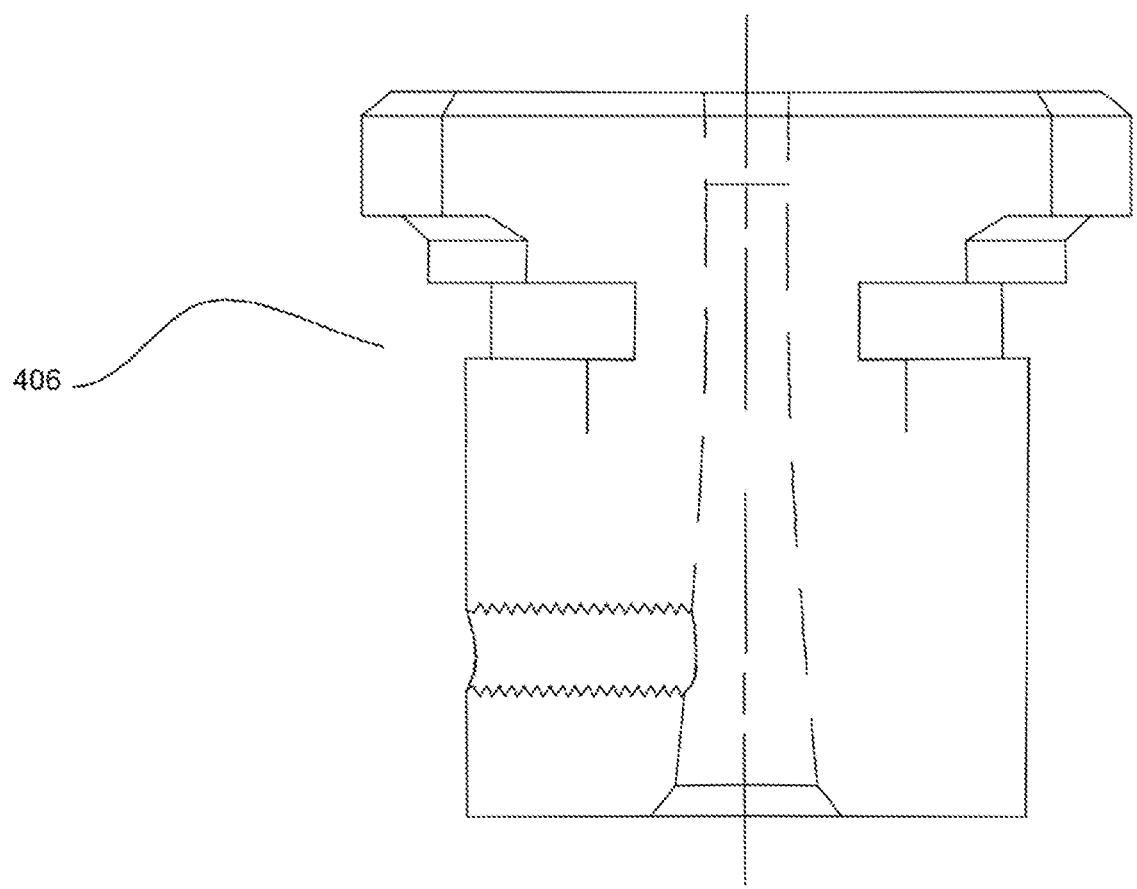
FIG. 16 illustrates an internal cross sectional view of the master die holder, in accordance with yet another embodiment of the present disclosure.

FIG. 16 illustrates a general overview 1600 of the machine die holder 406, in accordance with another embodiment of the present disclosure. The master die holder 106 holds the master die 108 in fixed position.

Figure 17:
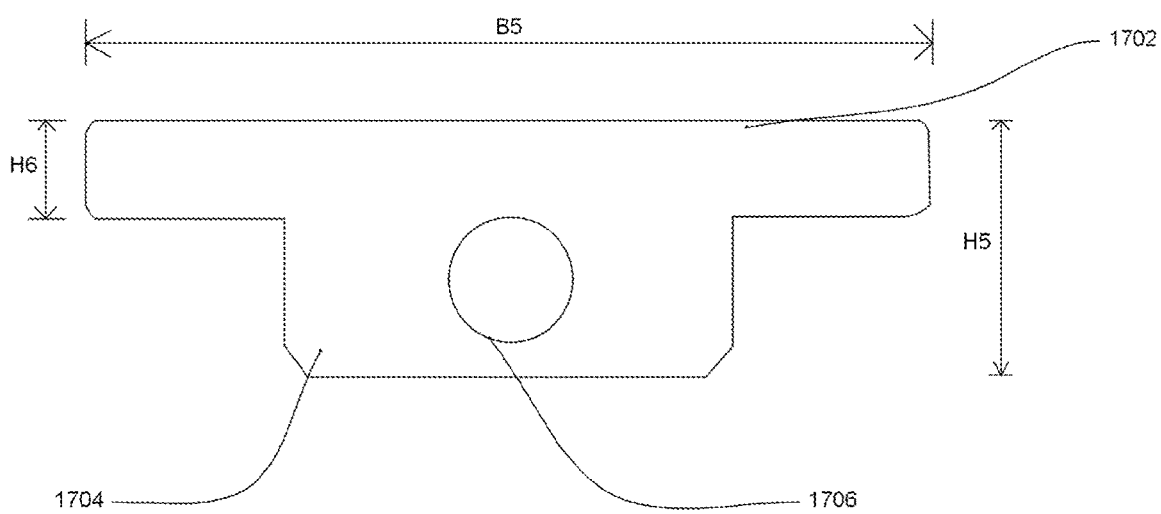
FIG. 17 illustrates a cross sectional view of a lay plate holder, in accordance with an embodiment of the present disclosure.

FIG. 17 illustrates a general overview 1700 of the lay plate holder 402, in accordance with an embodiment of the present disclosure. In an embodiment of the present disclosure, the lay plate holder 402 includes an upper part 1702 and a bottom part 1704. In an embodiment of the present disclosure, the upper part 1702 of the lay plate holder 402 has a breadth B5 of about 160.00 mm. In another embodiment of the present disclosure, the breadth B5 of the upper part 1702 of the lay plate holder 402 may vary. In an embodiment of the present disclosure, the lay plate holder 402 has a height H5 of about 40 mm. In another embodiment of the present disclosure, the height H5 of the lay plate holder 402 may vary. In an embodiment of the present disclosure, the upper part 1702 of the lay part holder 402 has a height H6 of about 15.00 mm. In another embodiment of the present disclosure, the height H6 of the upper part 1702 of the lay plate holder 402 may vary. The bottom part 1704 of the lay plate holder 402 includes a cavity 1706. The cavity 1706 is placed at center of the lay plate holder 402.

Figure 18:
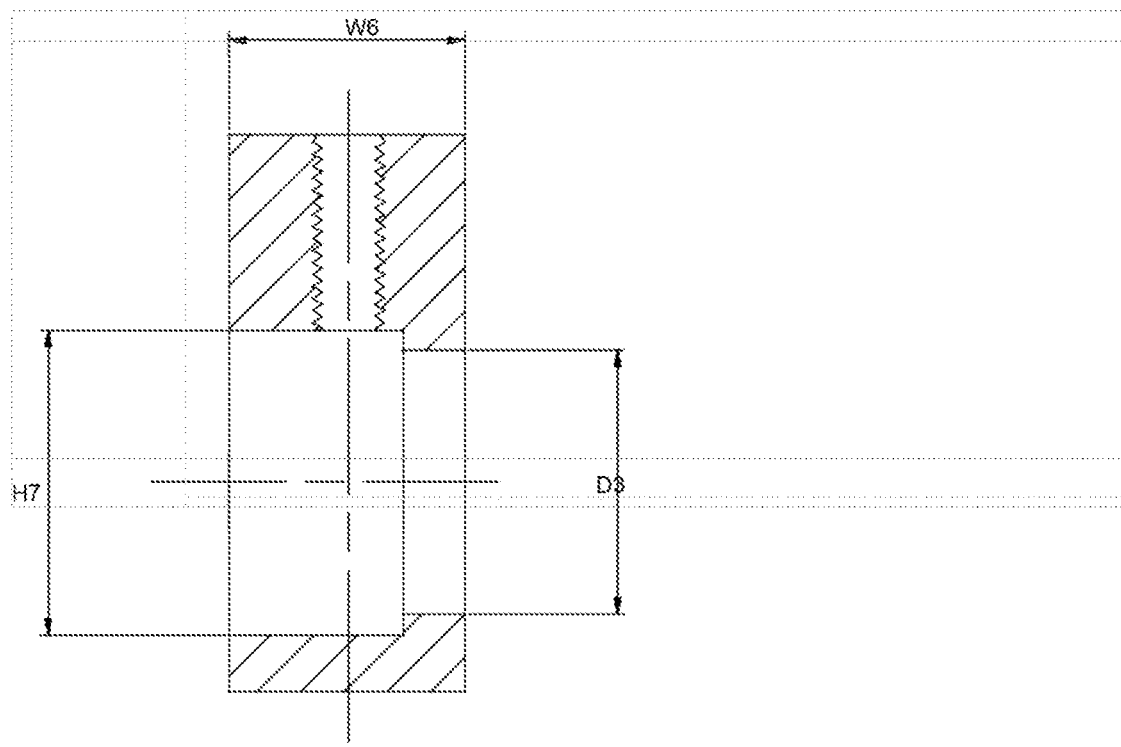
FIG. 18 illustrates a side section view of the lay plate holder, in accordance with an embodiment of the present disclosure.

FIG. 18 illustrates a side section view 1800 of the lay plate holder 402, in accordance with an embodiment of the present disclosure. In an embodiment of the present disclosure, the cavity 1706 of the bottom part 1704 of the lay plate holder 402 has a diameter D3 of about 19.00 mm. In another embodiment of the present disclosure, the diameter D3 of the cavity 1706 of the bottom part 1704 may vary. In an embodiment of the present disclosure, the bottom part 1704 of the lay plate holder 402 has a height H7 of about 22.00 mm. In another embodiment of the present disclosure, the height H7 of the bottom part 1704 of the lay plate holder 402 may vary. In an embodiment of the present disclosure, the upper part 1702 of the lay plate holder 402 has width W6 of about 20.00 mm. In another embodiment of the present disclosure, the width W6 of the upper part 1702 of the lay plate holder 402 may vary.

Figure 19:
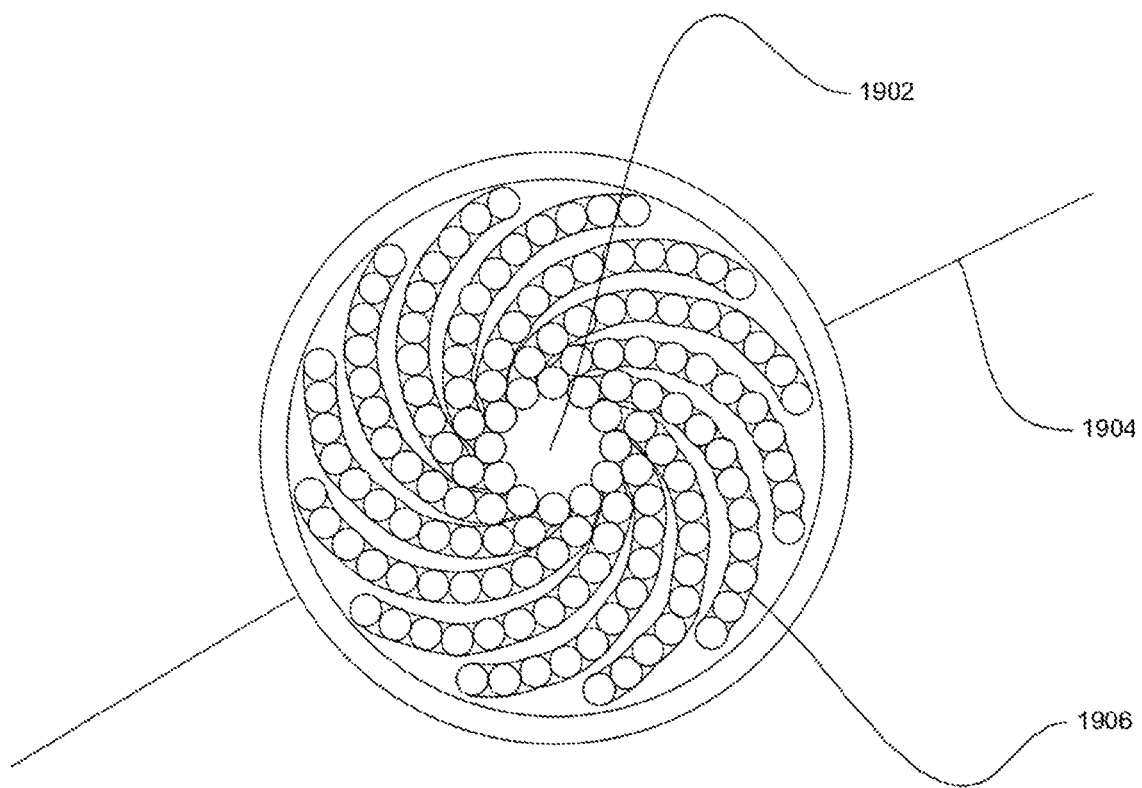
FIG. 19 illustrates a cross sectional view of a 144 fiber circular buffer tube with spiral arrangement of ribbons, in accordance with an embodiment of the present disclosure.
Figure 20:
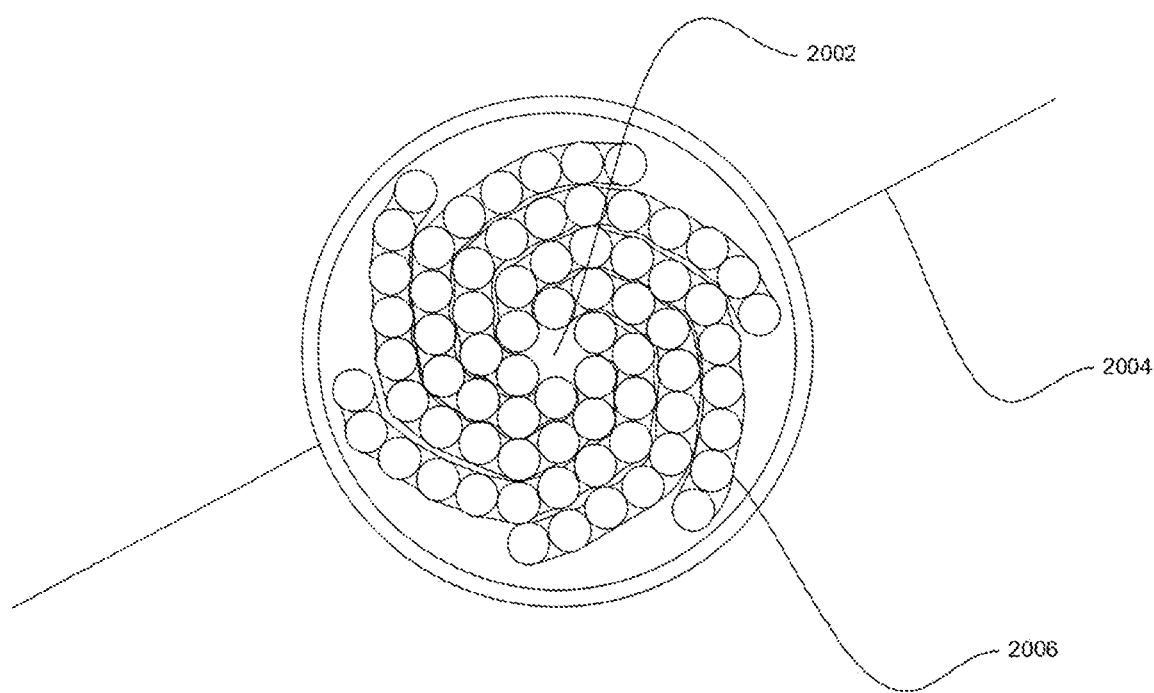
FIG. 20 illustrates a cross sectional view of a 72 fiber circular buffer tube with spiral arrangement of ribbons, in accordance with an embodiment of the present disclosure.
Figure 21:
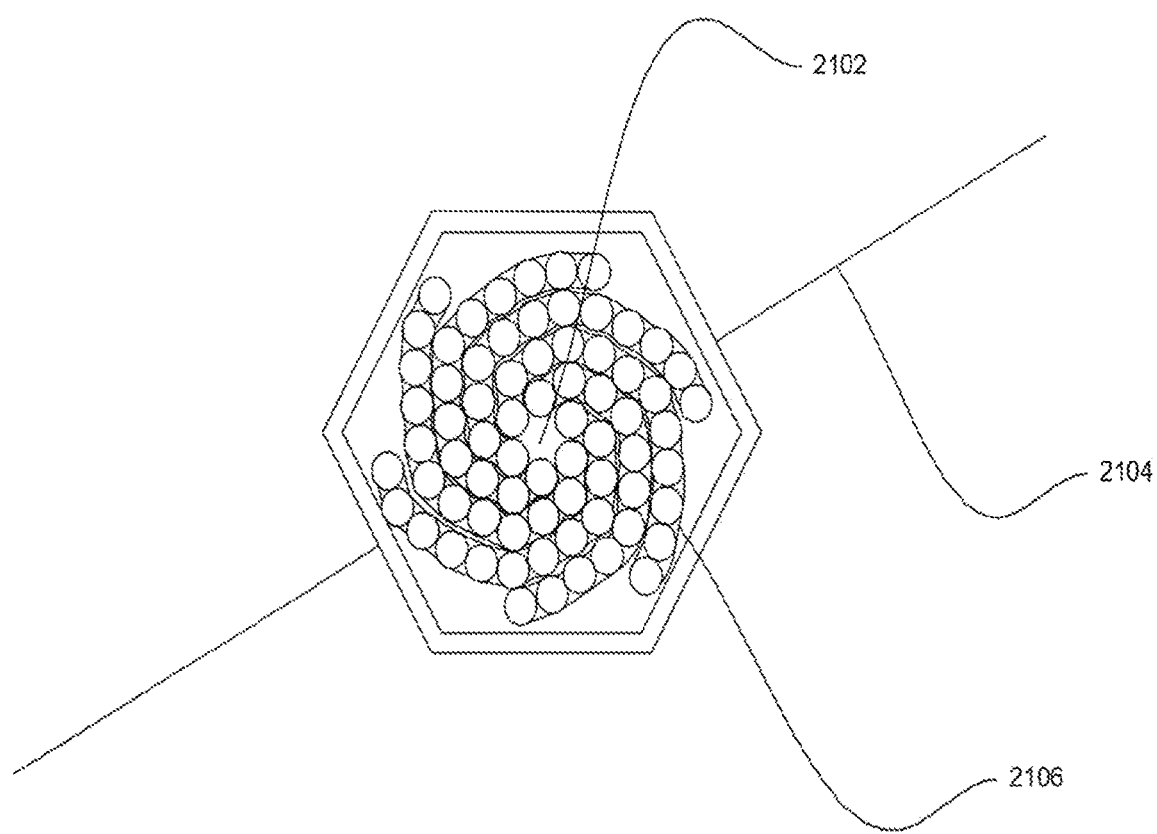
FIG. 21 illustrates a cross sectional view of a 72 fiber hexagonal shaped buffer tube with spiral arrangement of ribbons, in accordance with an embodiment of the present disclosure.

FIG. 19 illustrates a cross sectional view of a buffer tube 1900, in accordance with various embodiments of the present disclosure. FIG. 20 illustrates another cross sectional view of the buffer tube 1900, in accordance with another embodiment of the present disclosure. FIG. 21 illustrates yet another cross sectional view of the buffer tube 1900, in accordance with yet another embodiment of the present disclosure. In an embodiment of the present disclosure, the buffer tube 1900 may be circular in shape (as shown in FIG. 19 and FIG. 20). In another embodiment of the present disclosure, the buffer tube 1900 may have a hexagonal shape (as shown in FIG. 21). In yet another embodiment of the present disclosure, the buffer tube 1900 may be of any shape. In an embodiment of the present disclosure, the buffer tube 1900 is a circular shaped buffer tube with 144 optical fibers. The buffer tube 1900 of FIG. 19 is defined along a longitudinal axis 1904. In addition, the longitudinal axis 1904 passes through a geometrical center 1902 of the buffer tube 1900. The longitudinal axis 1904 of the buffer tube 1900 is an imaginary axis along lengthwise direction of the buffer tube 1900. The longitudinal axis 1904 passes through the geometrical center 1902 of the buffer tube 1900. The geometrical center 1902 of the buffer tube 1900 is a central point of the buffer tube 1900. In other words, the geometrical center 1902 of the buffer tube 1900 is defined as a midpoint of diameter of the buffer tube 1900. The buffer tube 1900 is circular in shape. The buffer tube 1900 has circular cross-section. In an embodiment of the present disclosure, shape of the buffer tube 1900 may vary. In general, the buffer tube 1900 protects optical fiber ribbons from any damage. Further, the buffer tube 1900 provides mechanical isolation, physical damage protection and identification of fibers. In an embodiment of the present disclosure, the buffer tube is a loose tube.

The buffer tube 1900 includes a plurality of optical fiber ribbons 1906 in FIG. 1. The plurality of optical fiber ribbons 1906 is arranged inside the buffer tube 1900 in spiral form.

Each of the plurality of optical fiber ribbons 1906 includes a plurality of optical fibers. In general, the optical fiber ribbon 1906 is an array of optical fibers placed side by side. In other words, the plurality of optical fibers is placed side by side to form the optical fiber ribbon. In an embodiment of the present disclosure, a matrix bonding material encases the plurality of optical fibers to form the optical fiber ribbon. In an embodiment of the present disclosure, the matrix bonding material is a UV curable bonding material. In addition, each of the plurality of optical fiber ribbon is a bendable optical fiber ribbon. The bendable optical fiber ribbon is a flexible ribbon. Each of the plurality of optical fiber ribbons is arranged spirally inside the buffer tube 1900. The spiral arrangement of the optical fiber ribbons 1906 enables reduction in point stresses on the plurality of optical fibers. In addition, the spiral arrangement of the optical fiber ribbons 1906 enables high density of optical fibers in an optical fiber cable with small diameter.

In an embodiment of the present disclosure, each of the plurality of optical fibers is a fiber used for transmitting information as light pulses from one end to another. In addition, each of the plurality of optical fibers is a thin strand of glass capable of transmitting optical signals. Also, each of the plurality of optical fibers is configured to transmit large amounts of information over long distances with relatively low attenuation. Further, each of the plurality of optical fibers includes a core region and a cladding region. The core region is an inner part of an optical fiber and the cladding section is an outer part of the optical fiber. In addition, the cladding region surrounds the core region.

The plurality of optical fiber ribbons 1906 are arranged spirally inside the buffer tube 1900. Each of the plurality of optical fiber ribbons 1906 includes a first edge and a second edge. The plurality of optical fiber ribbons 1906 are arranged in such a way that the first edge of each optical fiber ribbon of the plurality of optical fiber ribbons 1906 touches the first edge of two adjacent optical fiber ribbons of the plurality of optical fiber ribbons 1906 (as shown in FIG. 19). Each optical fiber ribbon of the plurality of optical fiber ribbons 1906 is a bendable optical fiber ribbon.

The plurality of optical fiber ribbons 1906 is arranged spirally inside the buffer tube 1900 to improve the packing efficiency of the buffer tube 1900. The plurality of optical fiber ribbons 1906 is arranged in the buffer tube 1900 in the form of a ribbon stack. In general, the ribbon stack is the arrangement of the plurality of ribbons in desired shape. The desired shape may correspond to rectangular shape, square shape, spiral shape and the like. The buffer tube 1900 include spiral shape ribbon stack. The plurality of ribbons is arranged in the buffer tube 1900 to form the spiral shape ribbon stack. Each of the plurality of optical fiber ribbons is a colored optical fiber ribbon. In an embodiment of the present disclosure, the color of each of the plurality optical fiber ribbons 1906 is different from other optical fiber ribbon of the plurality of optical fiber ribbon. Each of the plurality of optical fiber ribbon has a different color. In another embodiment of the present disclosure, the color of each of the plurality of optical fiber ribbon may vary according to the requirement or application. Each optical fiber ribbon of the plurality of optical fiber ribbon includes 12 optical fibers. In an embodiment of the present disclosure, each optical fiber ribbon of the plurality of optical fiber ribbons may include any suitable number of fibers. In an embodiment of the present disclosure, each optical fiber ribbon touches at least one optical fiber ribbon inside the tube. In an example, the top surface of a ribbon touches bottom surface of another ribbon. In another example, the bottom and top surfaces of a ribbon touches adjacent ribbon. The plurality of optical fiber ribbons 1906 is arranged spirally inside the buffer tube 1900 (as shown in FIG. 19). The spiral arrangement of the plurality of optical fiber ribbons 1906 is due to the flexible and bendable nature of the optical fiber ribbon. The spiral arrangement of the plurality of optical fiber ribbons 1906 improves the packing efficiency/density of the optical fiber ribbon inside the buffer tube 1900.

In an embodiment of the present disclosure, the buffer tube 1900 includes the plurality of optical fiber ribbons 1906. The plurality of optical fiber ribbons 1906 corresponds to 12 optical fiber ribbons. Each of the plurality of optical fiber ribbons 1906 includes the plurality of optical fibers. The plurality of optical fibers corresponds to 12 optical fibers. The buffer tube 1900 includes a total of 144 optical fibers (12*12=144). In an embodiment of the present disclosure, the buffer tube 1900 with 12 optical fiber ribbons with each optical fiber having a diameter of 200 microns has an inner diameter of about 2.8 millimeters and an outer diameter of about 3.2 millimeters. In an embodiment of the present disclosure, the buffer tube 1900 with 12 optical fiber ribbons with each optical fiber having a diameter of 200 microns has a thickness of about 0.2 millimeter. In an embodiment of the present disclosure, the buffer tube with 12 optical fiber ribbon may have any suitable diameter. In an embodiment of the present disclosure, fiber diameter may vary. In an embodiment of the present disclosure, the buffer tube with 12 optical fiber ribbon may have any suitable thickness. Furthermore, the buffer tube 1900 with 12 optical fiber ribbons has a packing efficiency of about 56.25%. In general, the packing efficiency is the fraction of total coverage area occupied by the bunch of ribbons in a buffer tube.

In an embodiment of the present disclosure, each of the plurality of optical fiber ribbons 1906 includes a plurality of optical fibers. Each optical fiber of the plurality of optical fibers has a diameter of about 200 microns. In another embodiment of the present disclosure, each optical fiber of the plurality of optical fibers has a diameter in a range of about 180-220 microns. In yet another embodiment of the present disclosure, the diameter of the plurality of optical fibers may vary.

In yet another embodiment of the present disclosure, the buffer tube 1900 includes a suitable number of optical fiber ribbons to improve the packing efficiency. In addition, each optical fiber ribbon may include any suitable number of optical fibers. Further, the buffer tube 1900 includes any suitable number of optical fibers according to the requirement.

In another embodiment of the present disclosure, the buffer tube 1900 is a circular shaped buffer tube with 72 optical fibers. In FIG. 20, The buffer tube 1900 is defined along a longitudinal axis 2004. In addition, the longitudinal axis 2004 passes through a geometrical center 2002 of the buffer tube 1900. The longitudinal axis 2004 of the buffer tube 1900 is an imaginary axis along lengthwise direction of the buffer tube 1900. The longitudinal axis 2004 passes through the geometrical center 2002 of the buffer tube 1900. The geometrical center 2002 of the buffer tube 1900 is a central point of the buffer tube 1900. In other words, the geometrical center 2002 of the buffer tube 1900 is defined as a midpoint of diameter of the buffer tube 1900. The buffer tube 1900 is circular in shape. The buffer tube has circular cross-section. In an embodiment of the present disclosure, shape of the buffer tube 1900 may vary. In general, the buffer tube 1900 protects optical fiber ribbons from any damage. Further, the buffer tube 1900 provides mechanical isolation, physical damage protection and identification of fibers. In an embodiment of the present disclosure, the buffer tube is a loose tube.

In FIG. 20, the buffer tube 1900 includes a plurality of optical fiber ribbons 2006. The plurality of optical fiber ribbons 2006 is arranged inside the buffer tube 1900 in spiral form. Each of the plurality of optical fiber ribbons 2006 includes a plurality of optical fibers. In general, the optical fiber ribbon 2006 is an array of optical fibers placed side by side. In other words, the plurality of optical fibers is placed side by side to form the optical fiber ribbon. In an embodiment of the present disclosure, a matrix bonding material encases the plurality of optical fibers to form the optical fiber ribbon. In an embodiment of the present disclosure, the matrix bonding material is a UV curable bonding material. In addition, each of the plurality of optical fiber ribbon is a bendable optical fiber ribbon. The bendable optical fiber ribbon is a flexible ribbon. Each of the plurality of optical fiber ribbons is arranged spirally inside the buffer tube 1900.

In an embodiment of the present disclosure, each of the plurality of optical fibers is a fiber used for transmitting information as light pulses from one end to another. The plurality of optical fiber ribbons 2006 is arranged spirally inside the buffer tube 1900 to improve the packing efficiency of the buffer tube 1900. The plurality of optical fiber ribbons 2006 is arranged in the buffer tube 1900 in the form of a ribbon stack. In general, the ribbon stack is the arrangement of the plurality of ribbons in desired shape. The desired shape may correspond to rectangular shape, square shape, spiral shape and the like. The buffer tube 1900 include spiral shape ribbon stack. The plurality of ribbons is arranged in the buffer tube 1900 to form the spiral shape ribbon stack. Each of the plurality of optical fiber ribbons is a colored optical fiber ribbon. In an embodiment of the present disclosure, the color of each of the plurality optical fiber ribbons 2006 is different from other optical fiber ribbon of the plurality of optical fiber ribbon. Each of the plurality of optical fiber ribbon has a different color. In another embodiment of the present disclosure, the color of each of the plurality of optical fiber ribbon may vary according to the requirement or application. Each optical fiber ribbon of the plurality of optical fiber ribbon includes 12 optical fibers. In an embodiment of the present disclosure, each optical fiber ribbon of the plurality of optical fiber ribbons may include any suitable number of fibers. In an embodiment of the present disclosure, each optical fiber ribbon touches at least one optical fiber ribbon inside the tube. In an example, the top surface of a ribbon touches bottom surface of another ribbon. In another example, the bottom and top surfaces of a ribbon touches adjacent ribbon. The plurality of optical fiber ribbons 2006 is arranged spirally inside the buffer tube 1900 (as shown in FIG. 20). The spiral arrangement of the plurality of optical fiber ribbons 2006 is due to the flexible and bendable nature of the optical fiber ribbon. The spiral arrangement of the plurality of optical fiber ribbons 2006 improves the packing efficiency/density of the optical fiber ribbon inside the buffer tube 1900.

The buffer tube 1900 includes the plurality of optical fiber ribbons 2006. The plurality of optical fiber ribbons 2006 corresponds to 6 optical fiber ribbons. The plurality of optical fiber ribbons includes the plurality of optical fibers. The plurality of optical fibers corresponds to 12 optical fibers. The buffer tube 1900 includes a total of 72 optical fibers (6*12=72). Furthermore, the buffer tube 1900 with 6 optical fiber ribbons has a packing efficiency of about 59.5%. Further, a circular shaped buffer tube with 6 optical fiber ribbons with each optical fiber having a diameter of 200 microns has an inner diameter of about 1.9 millimeters and an outer diameter of about 2.2 millimeters. In an embodiment of the present disclosure, fiber diameter may vary. In an embodiment of the present disclosure, the buffer tube with 6 optical fiber ribbons may have any suitable thickness. In an embodiment of the present disclosure, the buffer tube with 6 optical fiber ribbons may have any suitable diameter. In addition, the circular shaped buffer tube with 6 optical fiber ribbons with each optical fiber having a diameter of 200 microns has a thickness of about 0.15 millimeter. In addition, a hexagonal shaped buffer tube with six optical fiber ribbons per tube has a packing efficiency of about 61.5%.

In an embodiment of the present disclosure, the density and circularity in the buffer tube 1900 in FIG. 19 and FIG. 20 can be increased by adding rings around the plurality of optical fiber ribbons 1906, 2006. In an embodiment of the present disclosure, the rings are array of optical fibers. The array of optical fibers can be linear or circular. In an embodiment of the present disclosure, the position of rings may vary according to the space of the buffer tube 1900. The rings in the buffer tubes 1900 increase the overall density of the buffer tube 1900. In an embodiment of the present disclosure, the number of rings may vary according to the available space of buffer tube.

In an example, the buffer tube 1900 with 12 optical fiber ribbon has 144 optical fibers. The number of fibers in the buffer tube can increase to 288 fibers (24*12=288) when 12 rings, each having 12 fibers are placed in the buffer tube 1900.

In yet another embodiment of the present disclosure, the buffer tube 1900 includes a suitable number of optical fiber ribbons to improve the packing efficiency. In addition, each optical fiber ribbon may include any suitable number of optical fibers. Further, the buffer tube 1900 includes any suitable number of optical fibers according to the requirement.

In yet another embodiment of the present disclosure, the buffer tube 1900 is a hexagonal shaped buffer tube with 72 optical fibers (As shown in FIG. 21). In FIG. 21, The buffer tube 1900 is defined along a longitudinal axis 2104. In addition, the longitudinal axis 2104 is passes through a geometrical center 2102 of the buffer tube 1900. The longitudinal axis 2104 of the buffer tube 1900 is an imaginary axis along lengthwise direction of the buffer tube 1900. The longitudinal axis 2104 passes through the geometrical center 2102 of the buffer tube 1900. The geometrical center 2102 of the buffer tube 1900 is a central point of the buffer tube 1900. In other words, the geometrical center 2102 of the buffer tube 1900 is defined as a midpoint of diameter of the buffer tube 1900 in FIG. 21.

In FIG. 21, the buffer tube 1900 includes the plurality of optical fiber ribbons 2106. The plurality of optical fiber ribbons 2106 includes the plurality of optical fibers. The plurality of optical fiber ribbons 2106 corresponds to 6 optical fiber ribbon. In addition, each ribbon of the plurality of optical fiber ribbons includes 12 optical fibers. Thus, the buffer tube 1900 in FIG. 21 includes a total of 72 (12*6=72) optical fibers. Furthermore, the buffer tube 1900 with 72 optical fibers has a packing efficiency of about 61.5%. The hexagonal shape of the buffer tube 1900 in FIG. 21 results in increase in the packing efficiency of the buffer tube 1900 in an optical fiber cable.

In an embodiment of the present disclosure, the buffer tube 1900 may include any suitable number of ribbons and each ribbon may include any suitable number of optical fibers.

Each of the plurality of optical fiber ribbons 1906, 2006, 2106 is arranged inside the buffer tube 1900 in FIG. 19, FIG. 20 and FIG. 21 according to a method. The method enables arrangement of the plurality of optical fiber ribbons 1906, 2006, 2106 in the buffer tube 1900 for use in an optical fiber cable. The method includes a set of steps. The set of steps include a first step of receiving the plurality of optical fiber ribbons 1906, 2006, 2106. The set of steps include a second step of arranging the plurality of optical fiber ribbons 1906, 2006, 2106 in a spiral inside the buffer tube 1900.

In an embodiment of the present disclosure, the optical fiber ribbons 1906, 2006, 2106 are arranged in spirally out direction from a center of the buffer tube 1900 towards an inner wall of the buffer tube 1900 in a curved shape. In an embodiment of the present disclosure, each of the plurality of optical fiber ribbons 1906, 2006, 2106 is arranged in the one or more buffer tubes 202.

Figure 22:
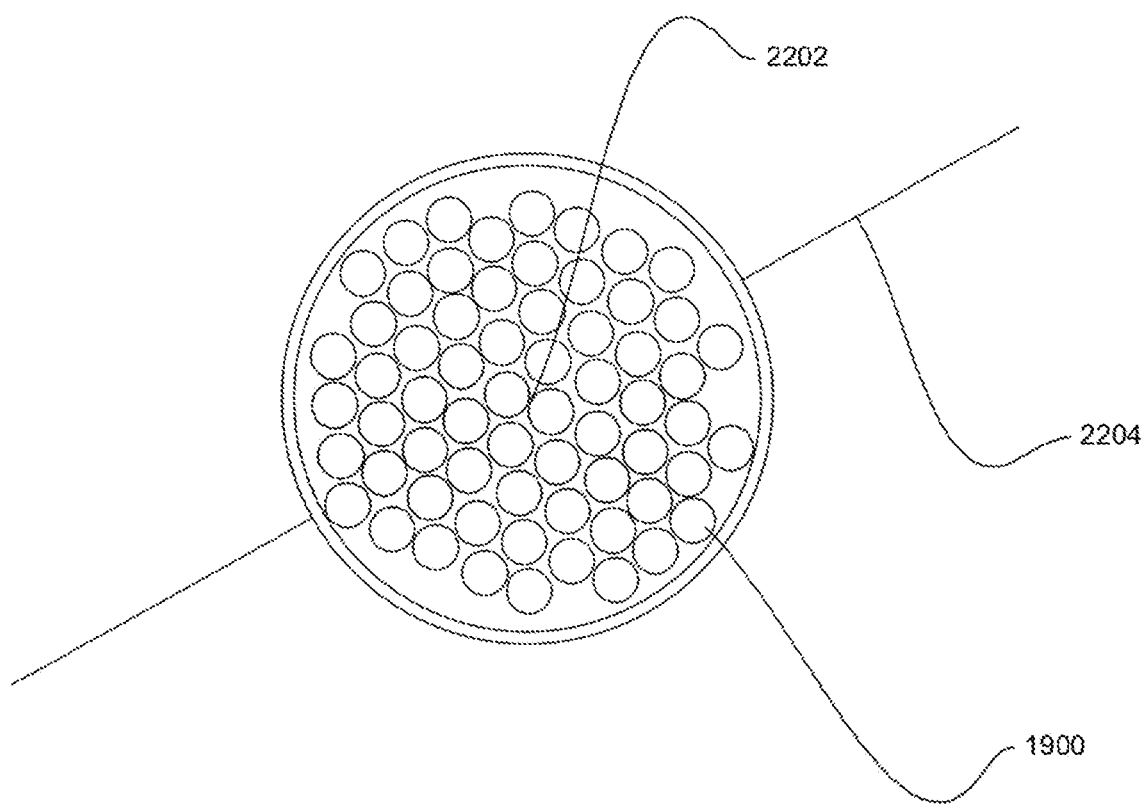
FIG. 22 illustrates a cross sectional view of an optical fiber cable with spiral arrangement of ribbons inside buffer tubes, in accordance with an embodiment of the present disclosure.
Figure 23:
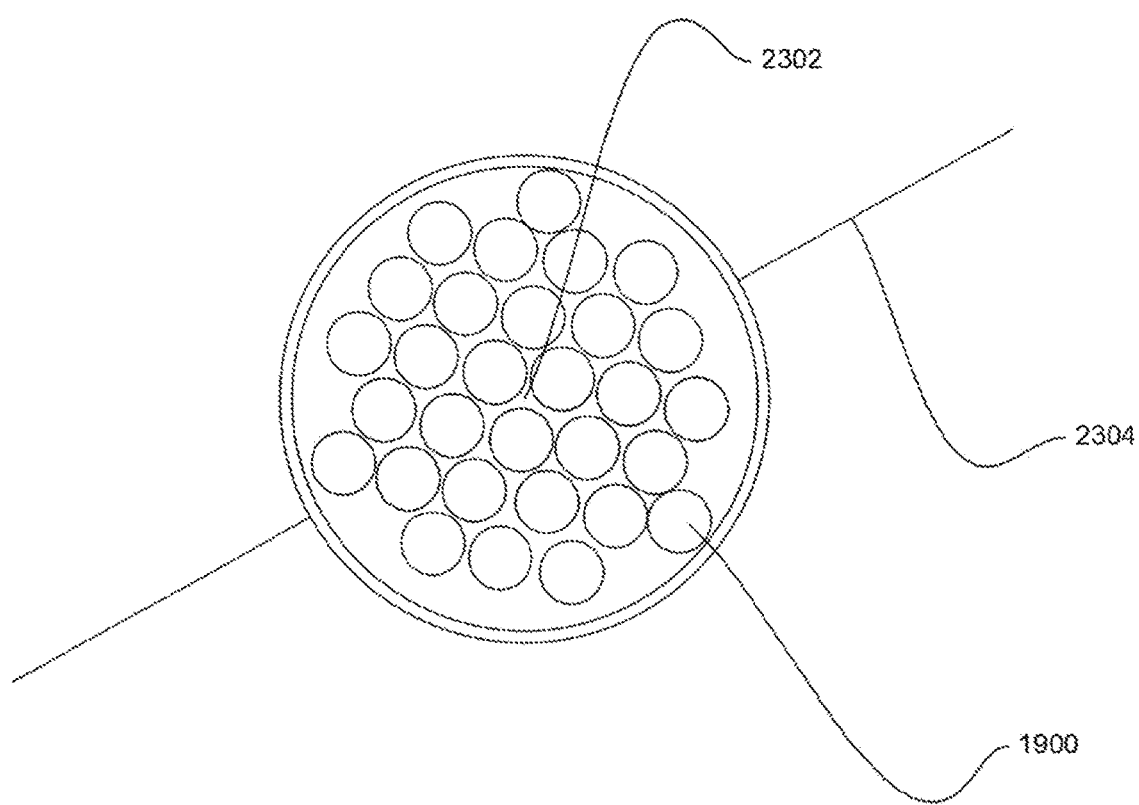
FIG. 23 illustrates a cross sectional view of another optical fiber cable with spiral arrangement of ribbons inside buffer tubes, in accordance with another embodiment of the present disclosure.

FIG. 22 illustrates a cross-sectional view of an optical fiber cable 2200, in accordance with an embodiment of the present disclosure. FIG. 23 illustrates a cross-sectional view of another optical fiber cable 2300, in accordance with another embodiment of the present disclosure. The optical fiber cable 2200 includes 6 ribbons per buffer tube. In general, the optical fiber cable 2200 is a type of cable that has a number of optical fibers for the transmission of a signal from one end to another end. Optical fiber cables are used to transfer digital data signals in the form of light up to distances of hundreds of miles. The optical fiber cable 2200 is defined along a longitudinal axis 2204. In addition, the longitudinal axis 2204 passes through a geometrical center 2202 of the optical fiber cable 2200. The longitudinal axis 2204 of the optical fiber cable 2200 is an imaginary axis along lengthwise direction of the optical fiber cable 2200. The longitudinal axis 2204 passes through the geometrical center 2202 of the optical fiber cable 2200. The geometrical center 2202 of the optical fiber cable 2200 is a central point of the optical fiber cable 2200. In other words, the geometrical center 2202 of the optical fiber cable 2200 is defined as a midpoint of diameter of the optical fiber cable 2200. The optical fiber cable 2200 includes the plurality of optical fiber ribbons 1906, 2006, 2106 and a jacket 2206. The plurality of optical fiber ribbons 1906, 2006, 2106 is arranged spirally inside one or more buffer tube. The jacket 2206 encloses the plurality of optical fiber ribbons 1906, 2006, 2106. In an embodiment of the present disclosure, the optical fiber cable 2200 includes a plurality of buffer tubes. Each of the plurality of buffer tubes corresponds to the buffer tube 1900 shown in FIG. 19, FIG. 20 and FIG. 21.

The buffer tube 1900 includes 6 optical fiber ribbons. Each optical fiber ribbon includes 12 optical fibers. Thus, each buffer tube of the plurality of buffer tubes 1900 includes a total of 72 optical fibers.

In another embodiment of the present disclosure, each of the plurality of buffer tubes 1900 may include any suitable number of optical fiber ribbons and each optical fiber ribbon may have any suitable number optical fibers.

In another embodiment of the present disclosure, each of the plurality of buffer tubes 1900 may have any shape of cross-section. In an example, the shape may be square, rectangle, pentagon, triangle, hexagonal and the like.

In another embodiment of the present disclosure, the optical fiber cable 2300 includes 12 ribbons per buffer tube. In general, the optical fiber cable 2300 is a type of cable that has a number of optical fibers for the transmission of a signal from one end to another end. Optical fiber cables are used to transfer digital data signals in the form of light up to distances of hundreds of miles. The optical fiber cable 2300 is defined along a longitudinal axis 2304. In addition, the longitudinal axis 2304 passes through a geometrical center 2302 of the optical fiber cable 2300. The longitudinal axis 2304 of the optical fiber cable 2300 is an imaginary axis along lengthwise direction of the optical fiber cable 2300. The longitudinal axis 2304 passes through the geometrical center 2302 of the optical fiber cable 2300. The geometrical center 2302 of the optical fiber cable 2300 is a central point of the optical fiber cable 2300. In other words, the geometrical center 2302 of the optical fiber cable 2300 is defined as a midpoint of diameter of the optical fiber cable 2300. The optical fiber cable 2300 includes the plurality of optical fiber ribbons 1906, 2006, 2106 and a jacket 2306. The plurality of optical fiber ribbons 1906, 2006, 2106 is arranged spirally inside the one or more buffer tube. The jacket 2306 encloses the plurality of optical fiber ribbons 1906, 2006, 2106. In an embodiment of the present disclosure, the optical fiber cable 2300 includes the plurality of buffer tubes. Each of the plurality of buffer tubes corresponds to the buffer tube 1900 shown in FIG. 19, FIG. 20 and FIG. 21.

The buffer tube 1900 in the optical fiber cable 2300 includes 12 optical fiber ribbons. Each optical fiber ribbon includes 12 optical fibers. Thus, each buffer tube of the plurality of buffer tubes 1900 includes a total of 144 optical fibers.

In another embodiment of the present disclosure, each of the plurality of buffer tubes 1900 in the optical fiber cable 2300 may include any suitable number of optical fiber ribbons and each optical fiber ribbon may have any suitable number optical fibers.

In another embodiment of the present disclosure, each of the plurality of buffer tubes 1900 in the optical fiber cable 2300 may have any shape of cross-section. In an example, the shape may be square, rectangle, pentagon, triangle, hexagonal and the like.

In an embodiment of the present disclosure, the optical fiber cable 2200, 2300 may include at least one of a plurality of components selected from a group. The group includes a central strength member, peripheral strength member, water swellable yarns, water swellable tape, aramid yarns, sheath, ripcords, embedded strength member and the like.

In an embodiment of the present disclosure, the buffer tube 1900 with 6 ribbons has higher packing efficiency than the buffer tube 1900 with 12 ribbons. In addition, in this configuration, an optical fiber cable with 6 ribbons per tube has a higher packing efficiency than an optical fiber cable with 12 ribbons per tube.

In an embodiment of the present disclosure, the optical fiber cable 2200, 2300 further includes one or more of the one or more buffer tubes 1900 and one or more of one or more binding yarns and one or more binding tapes. The plurality of optical fiber ribbons 1906, 2006, 2106 is enclosed in the one or more buffer tubes 1900. The one or more of the one or more binding yarns and the one or more binding tapes are wound around the one or more buffer tubes 1900. In an embodiment of the present disclosure, the one or more buffer tube 1900 has a circular cross-section shape (as shown in FIG. 19 and FIG. 20). In another embodiment of the present disclosure, the one or more buffer tube 1900 has a hexagonal cross-section shape (as shown in FIG. 21).

In an embodiment of the present disclosure, the optical fiber ribbons 1906, 2006, 2106 in the optical fiber cable 2200, 2300 are arranged in spirally out direction from a center of the one or more buffer tube towards an inner wall of the one or more buffer tube 1900 in a curved shape. In an embodiment of the present disclosure, the plurality of optical fiber ribbons 1906, 2006, 2106 in the optical fiber cable 2200, 2300 are wrapped with one or more of one or more yarns, one or more binders, one or more tapes and one or more layers. In an embodiment of the present disclosure, the plurality of optical fiber ribbons 1906, 2006, 2106 in the optical fiber cable 2200, 2300 is arranged concentrically inside the one or more buffer tube 1900 in the plurality of circular arcs 104.

In an embodiment of the present disclosure, the buffer tube 1900 may be replaced by aramid yarns or any other kind of yarns. In an embodiment of the present disclosure, the buffer tube 1900 may be replaced by and the plurality of optical fiber ribbons 1906, 2006, 2106 are wrapped with one or more of one or more yarns, one or more binders, one or more tapes and one or more layers.

The spiral arrangement of the optical fiber ribbons has numerous advantages over the prior art. The spiral arrangement of the optical fiber ribbon in the buffer tube increases the packing efficiency of the buffer tube. In addition, the spiral arrangement of the optical fiber ribbons in the buffer tube results in high fiber density per tube. Further, the spiral arrangement of the optical fiber ribbons in the buffer tube facilitates reduction in the cable diameter. Furthermore, the spiral arrangement of the optical fiber ribbons in the buffer tube lowers the point stresses on fibers of the ribbon. Moreover, the spiral arrangement of the optical fiber ribbons in the buffer tube provides high density buffer tube in reduced cable diameter.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

Although the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

What is claimed is:

1. A method for arranging a plurality of optical fiber ribbons in an optical fiber cable, the method comprising:
   receiving a plurality of optical fiber ribbons; and
   arranging the plurality of optical fiber ribbons in a plurality of circular arcs in optical fiber cable, wherein the plurality of circular arcs are substantially parallel such that the plurality of circular arcs are arranged unevenly over each other, wherein a number of optical fiber ribbons in each layer decreases gradually from an outermost layer to an innermost layer.

2. The method as claimed in claim 1, wherein the plurality of optical fiber ribbons is arranged concentrically by a guide.

3. The method as claimed in claim 1, wherein the plurality of optical fiber ribbons are wrapped with one or more of one or more yarns, one or more binders, one or more tapes and one or more layers.

4. The method as claimed in claim 1, wherein each circular arc of the plurality of circular arcs is in contact with at least one circular arc of the plurality of circular arcs.

5. The method as claimed in claim 1, wherein the plurality of circular arcs is in the buffer tube.

6. The method as claimed in claim 1, wherein arranging the plurality of optical fiber ribbons further comprising placing the plurality of optical fiber ribbons such that at least one of a top surface and a bottom surface of each optical fiber ribbon of the plurality of optical fiber ribbons is contact with at least one optical fiber ribbon of the plurality of optical fiber ribbons.

7. The method as claimed in claim 1, wherein the plurality of circular arcs is concentric.

8. The method as claimed in claim 1, wherein the plurality of optical fiber ribbons are arranged such that placement of each optical fiber ribbon is defined by a radius and a radius of curvature, wherein the placement of each optical fiber ribbon of the plurality of optical fiber ribbons is defined by a first radius of curvature.

9. The method as claimed in claim 1, wherein the plurality of optical fiber ribbons are arranged such that placement of each optical fiber ribbon is defined by a radius and a radius of curvature, wherein an optical fiber ribbon defined by a first radius is not in contact with other optical fiber ribbon defined by the first radius.

10. The method as claimed in claim 1, wherein the optical fiber ribbons are arranged in spirally out direction from a center of the buffer tube towards an inner wall of the buffer tube in a curved shape.

11. The method as claimed in claim 1, further comprising one or more buffer tubes, wherein the plurality of optical fiber ribbons are arranged in the one or more buffer tubes.

12. An optical fiber cable comprising:
    a plurality of optical fiber ribbons, wherein the plurality of optical fiber ribbons are arranged in a plurality of circular arcs in the optical fiber cable, wherein the plurality of circular arcs are substantially parallel such that the plurality of circular arcs are arranged unevenly over each other, wherein a number of optical fiber ribbons in each layer decreases gradually from an outermost layer to an innermost layer, and
    a jacket enclosing the plurality of optical fiber ribbons.

13. The optical fiber cable as claimed in claim 12 further comprising one or more of:
    the one or more buffer tubes, wherein the plurality of optical fiber ribbons are enclosed in the one or more buffer tubes; and
    one or more of one or more binding yarns and one or more binding tapes, wherein the one or more of the one or more binding yarns and the one or more binding tapes are wound around the one or more buffer tubes.

14. The optical fiber cable as claimed in claim 12 further comprising one or more of one or more yarns, one or more binders, one or more tapes and one or more layers, wherein the one or more of the one or more yarns, the one or more binders, the one or more tapes and the one or more layers wraps the plurality of optical fiber ribbons.

15. The optical fiber cable as claimed in claim 12, wherein the plurality of optical fiber ribbons are arranged concentrically.

16. The optical fiber cable as claimed in claim 12, wherein each circular arc of the plurality of circular arcs is in contact with at least one circular arc of the plurality of circular arcs.

17. The optical fiber cable as claimed in claim 12, wherein the plurality of optical fiber ribbons are placed such that at least one of a top surface and a bottom surface of each optical fiber ribbon of the plurality of optical fiber ribbons is contact with at least one optical fiber ribbon of the plurality of optical fiber ribbons.

18. The optical fiber cable as claimed in claim 12, wherein each of the plurality of circular arcs is concentric.

19. The optical fiber cable as claimed in claim 12, wherein the plurality of optical fiber ribbons are arranged such that placement of each optical fiber ribbon is defined by a radius and a radius of curvature, wherein the placement of each optical fiber ribbon of the plurality of optical fiber ribbons is defined by a first radius of curvature.

20. The optical fiber cable as claimed in claim 12, wherein the plurality of optical fiber ribbons are arranged such that placement of each optical fiber ribbon is defined by a radius and a radius of curvature, wherein an optical fiber ribbon defined by a first radius is not in contact with other optical fiber ribbon defined by the first radius.

21. The optical fiber cable as claimed in claim 12, wherein the optical fiber ribbons are arranged in spirally out direction from a center of the one or more buffer tube towards an inner wall of the one or more buffer tube in a curved shape.

22. The optical fiber cable as claimed in claim 12, wherein the plurality of optical fiber ribbons are wrapped with one or more of one or more yarns, one or more binders, one or more tapes and one or more layers.

\* \* \* \* \*